(12) United States Patent
Oe et al.

(10) Patent No.: US 12,530,005 B2
(45) Date of Patent: Jan. 20, 2026

(54) SYNTHETIC INERTIA FOR ENERGY SYSTEMS

(71) Applicant: FLUENCE ENERGY, LLC, Arlington, VA (US)

(72) Inventors: Sung Pil Oe, Tonbridge (GB); Krishna Kumar Anaparthi, Garching bei Munchen (DE); Hernan Rochina Perez, Valencia (ES); Efosa Osakue, Birmingham (GB); Benjamin Joseph Braun, Berlin (DE)

(73) Assignee: FLUENCE ENERGY, LLC, Arlington, VA (US)

( * ) Notice: Subject to any disclaimer, the term of this patent is extended or adjusted under 35 U.S.C. 154(b) by 504 days.

(21) Appl. No.: 18/177,582

(22) Filed: Mar. 2, 2023

(65) Prior Publication Data
US 2024/0295861 A1 Sep. 5, 2024

(51) Int. Cl.
*G05B 17/02* (2006.01)
*H02J 3/32* (2006.01)
(Continued)

(52) U.S. Cl.
CPC ........... *G05B 17/02* (2013.01); *H02J 3/32* (2013.01); *H02J 3/38* (2013.01); *H02J 3/48* (2013.01)

(58) Field of Classification Search
None
See application file for complete search history.

(56) References Cited

U.S. PATENT DOCUMENTS

| 8,175,964 B2 | 5/2012 | Arfin |
| 8,428,806 B2 | 4/2013 | Kelty et al. |

(Continued)

FOREIGN PATENT DOCUMENTS

| CN | 205123279 U | * | 3/2016 | ............ H02J 3/32 |
| CN | 105914765 A | * | 8/2016 | ............ H02J 3/24 |

(Continued)

OTHER PUBLICATIONS

Silva et al., "System Frequency Support by Synthetic Inertia Control via BESS", 2019, IEEE. (Year: 2019).*

(Continued)

*Primary Examiner* — Mohammad Ali
*Assistant Examiner* — Kelvin Booker
(74) *Attorney, Agent, or Firm* — Buchanan Ingersoll & Rooney PC

(57) ABSTRACT

Methods, systems, apparatuses, and non-transitory computer-readable media are provided for synthetic inertia for energy systems. In one implementation, the computer-readable media may include instructions to cause a processor to: obtain a rate of change of a frequency of alternating current of an electrical grid; determine a mapping between the rate of change of the frequency and an amount of change of output power for energy storage unit(s) coupled to the electrical grid; calculate, based on the mapping and the rate of change of the frequency, an amount of change of the output power for the energy storage unit(s); determine, based on a reference output power and the calculated amount of change, an adjusted output power; and configure, based on the adjusted output power, the energy storage unit(s) to output electricity to the electrical grid.

20 Claims, 10 Drawing Sheets

(51) Int. Cl.
  *H02J 3/38* (2006.01)
  *H02J 3/48* (2006.01)

(56) References Cited

U.S. PATENT DOCUMENTS

| | | | |
|---|---|---|---|
| 8,629,657 B2 | 1/2014 | Kishiyama et al. | |
| 8,996,191 B2 | 3/2015 | Carlson et al. | |
| 9,026,405 B2 | 5/2015 | Buckley | |
| 9,379,639 B2 | 6/2016 | Mumtaz | |
| 9,489,103 B2 | 11/2016 | Brier et al. | |
| 10,359,797 B2 | 7/2019 | Carlson | |
| 2011/0278853 A1* | 11/2011 | Capp | H02J 3/30 290/1 A |
| 2012/0323396 A1* | 12/2012 | Shelton | H02M 7/44 700/297 |
| 2014/0070617 A1* | 3/2014 | Detmers | H02J 7/0071 307/64 |
| 2014/0074311 A1* | 3/2014 | Kearns | H02J 3/38 700/297 |
| 2015/0207355 A1* | 7/2015 | Taylor | H02J 7/0063 320/136 |
| 2016/0336753 A1* | 11/2016 | Kam | H02J 3/16 |
| 2017/0074918 A1 | 3/2017 | Stewart et al. | |
| 2017/0179722 A1* | 6/2017 | Porter | H02J 3/32 |
| 2020/0052492 A1 | 2/2020 | Rive et al. | |
| 2020/0389024 A1* | 12/2020 | Vartanian | H02J 3/001 |
| 2024/0195172 A1* | 6/2024 | Lyhne | H02J 3/241 |

FOREIGN PATENT DOCUMENTS

| | | | | |
|---|---|---|---|---|
| CN | 110676862 A | * | 1/2020 | H02J 3/24 |
| CN | 110120677 B | * | 2/2021 | H02J 3/28 |
| CN | 113922427 A | * | 1/2022 | H02J 3/241 |
| CN | 114520519 A | * | 5/2022 | H02J 3/32 |
| CN | 115102198 A | * | 9/2022 | H02J 3/32 |
| CN | 115714435 A | * | 2/2023 | H02J 3/32 |

OTHER PUBLICATIONS

Xing et al., "An adaptive virtual inertia control strategy for distributed battery energy storage system in microgrids", Mar. 2021, Energy 233 (2021) 121155. (Year: 2021).*

Yang et al., "Synthetic-Inertia-Based Modular Multilevel Converter Frequency Control for Improved Micro-Grid Frequency Regulation", 2018, Energy Conversion Conference. (Year: 2018).*

Bonfiglio et al., "Design and Implementation of a Variable Synthetic Inertia Controller for Wind Turbine Generators", Jan. 2019, IEEE Transactions on Power Systems, vol. 34, No. 1. (Year: 2019).*

Magdy et al., "A new synthetic inertia system based on electric vehicles to support the frequency stability of low-inertia modern power grids", 2021, Journal of Cleaner Production 297 (2021) 126595 (Year: 2021).*

Chamorro et al., "Distributed Synthetic Inertia Control in Power Systems", 2017, IEEE. (Year: 2017).*

Qi et al., "Synthetic Inertia Control of Grid-Connected Inverter Considering the Synchronization Dynamics", Feb. 2022, IEEE Transactions on Power Electronics, vol. 37, No. 2. (Year: 2022).*

Gao et al., "Improving Frequency Stability in Low Inertia Power Systems Using Synthetic Inertia from Wind Turbines", Jun. 2017, IEEE Manchester PowerTech. (Year: 2017).*

Bruno et al., "A Low-cost Controller to Enable Synthetic Inertia Response of Distributed Energy Resources", 2020, IEEE (Year: 2020).*

Berizzi et al., "Analysis of Synthetic Inertia Strategies from Wind Turbines for Large System Stability", May/Jun. 2022, IEEE Transactions on Industry Applications, vol. 58, No. 3. (Year: 2022).*

GMP232/x, Bachmann electronic GmbH, 7 pages, https://www.bachmann.info/en/products/gmp232-x (accessed on Nov. 28, 2023).

GMP232/x Grid Measurement and Protection Module, Bachmann electronic GmbH, 9 pages, https://www.bachmann.info/media/226/download/GMP232-x_en.pdf?v=4 (accessed on Nov. 28, 2023).

Tesla Energy Software, Tesla, 4 pages, https://www.tesla.com/support/energy/tesla-software (accessed on Nov. 28, 2023).

Fred Lambert, Tesla has a new product called 'Virtual Machine Mode' coming to its 'Big Battery', Jul. 27, 2022, Electrek, 6 pages, https://electrek.co/2022/07/27/tesla-virtual-machine-mode-coming-big-battery/ (accessed on Nov. 28, 2023).

Zachary Shahan, World 1st: Tesla Batteries Providing Inertia Services At Scale, CleanTechnica, 13 pages, https://cleantechnica.com/2022/08/01/world-1st-tesla-batteries-providing-inertia-services-at-scale/ (accessed on Nov. 28, 2023).

* cited by examiner

SYNTHETIC INERTIA FOR ENERGY SYSTEMS

TECHNICAL FIELD

The present disclosure generally relates to the field of energy systems. More specifically, the present disclosure relates to synthetic inertia for energy systems.

BACKGROUND

An electrical grid may be used for electricity delivery from producers to consumers. With an electrical grid, power stations may generate electrical energy, which may be delivered to consumers via substations, electrical power transmission, electrical power distribution, and/or other components.

SUMMARY

In an electrical grid, the kinetic energy stored in spinning generators and/or motors (e.g., at power stations, industrial facilities, or other facilities) may be considered as inertia of the electrical grid, for example, as the generators and/or motors may rotate in a synchronized manner (e.g., at a frequency of the electrical grid or at other associated frequencies). The inertia of the electrical grid may help maintain the stability of the frequency of the electrical grid. Energy sources such as batteries, photovoltaic power stations, solar farms, energy sources configured to output energy using power inverters, or other types of energy sources may not include rotating generators and/or motors. As these types of energy sources providing energy become connected to the electrical grid and become more prevalent in the electrical grid, the proportion of entities providing inertia in the electrical grid (e.g., from spinning generators and/or motors) may reduce. Inertia in an electrical grid may help maintain the frequency of the electrical grid from sudden changes following a disturbance. The frequency changes, if not contained within limits, may lead to stability issues of the electrical grid or even a system collapse.

Disclosed embodiments may relate to systems and methods directed to synthetic inertia for an energy system, for example, by controlling the output power of energy storage unit(s) coupled to an electrical grid based on the measured rate of change of the frequency of the electrical grid, to help maintain the stability of the frequency of the electrical grid, as described in greater detail herein.

Disclosed embodiments may relate to synthetic inertia for energy systems. Embodiments consistent with the present disclosure may provide systems, methods, and apparatuses associated with energy systems. Disclosed embodiments may include systems, methods, apparatuses, and non-transitory computer-readable media for providing synthetic inertia for energy systems. For example, disclosed embodiments may include: obtaining, by a computing device, a rate of change of a frequency of alternating current of an electrical grid. In some embodiments, one or more energy storage units may be coupled to the electrical grid. Disclosed embodiments may include: determining a mapping between the rate of change of the frequency and an amount of change of output power for the one or more energy storage units; calculating, based on the mapping and the rate of change of the frequency, an amount of change of the output power for the one or more energy storage units; determining, based on a reference output power for the one or more energy storage units and the calculated amount of change, an adjusted output power; and configuring, based on the adjusted output power, the one or more energy storage units to output electricity to the electrical grid.

Consistent with disclosed embodiments, non-transitory computer-readable media may store instructions that, when executed by at least one processor, may cause the at least one processor to perform any of the processes described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings.

DETAILED DESCRIPTION

Figure 1:
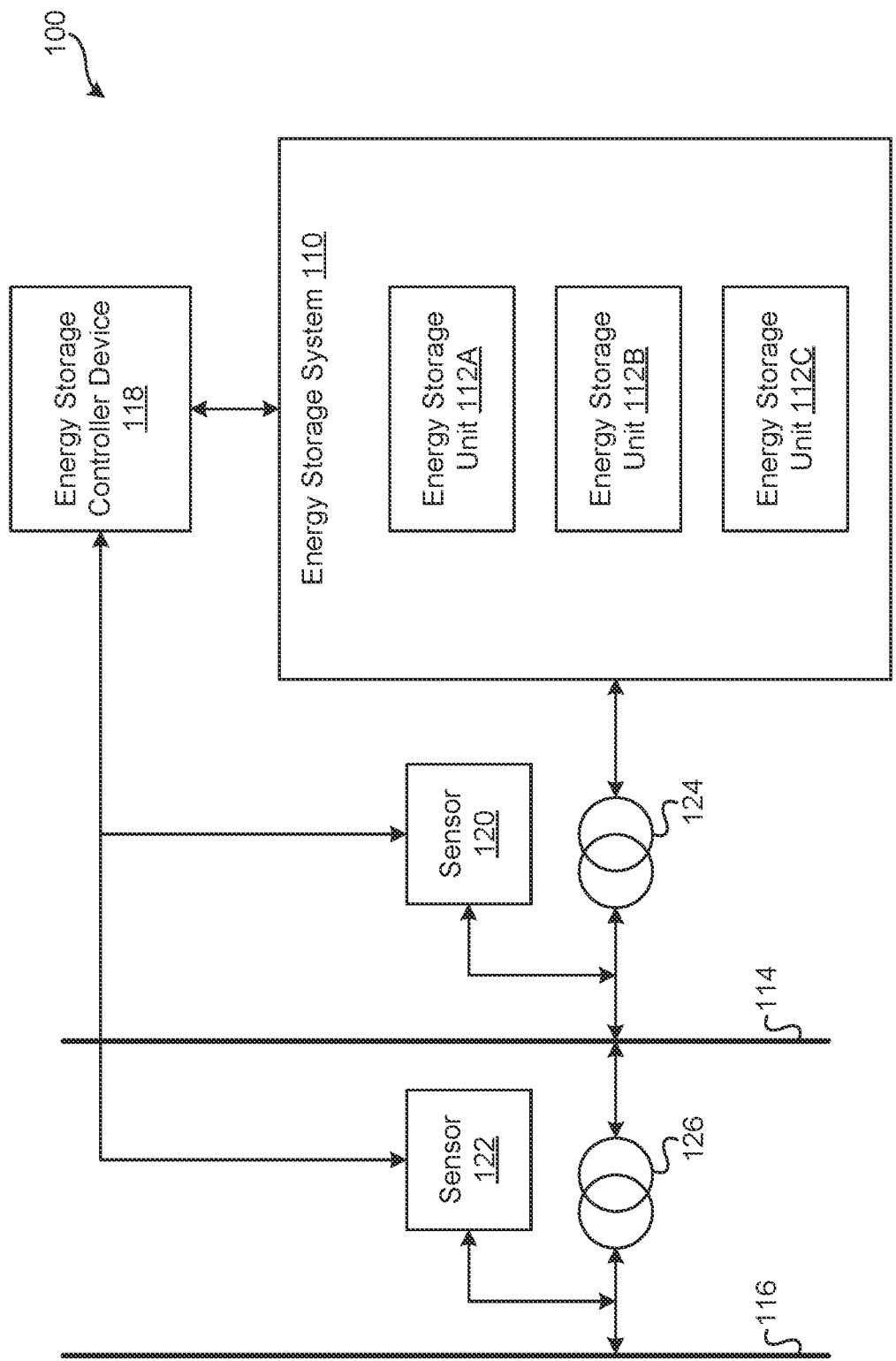
FIG. 1 shows an example system for managing an energy system, consistent with some embodiments of the present disclosure.

The following detailed description refers to the accompanying drawings. Wherever possible, the same reference numbers are used in the drawings and the following description to refer to the same or similar parts. While several illustrative embodiments are described herein, modifications, adaptations, and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description is not limited to the specific embodiments and examples, but is inclusive of general principles described herein and illustrated in the figures in addition to the general principles encompassed by the appended claims.

A decrease of inertia in an electrical grid may be resulted, for example, from the increasing levels of renewable energy resources interfaced through power converters (e.g., which may not contribute inertia to the electrical grid) connecting to the electrical grid and displacing the fossil fuel based synchronous generator plants, thermal power plants, and/or other power plants providing inertia. The decrease of inertia in the electrical grid may lead to higher and faster deviations in the frequency of the electrical grid following a disturbance.

Inertia in an electrical grid may help maintain the frequency of the electrical grid from sudden changes following a disturbance. The frequency changes, if not contained within limits, may lead to stability issues. Inertia in an electrical grid may be one of the key parameters for frequency stability and may determine the initial rate of change of frequency (RoCoF) following a sudden imbalance between generation and demand. In an electrical grid with low total inertia, a challenge that transmission system operators (TSOs) may face may include limiting the initial RoCoF.

The initial RoCoF after a disturbance may need to be maintained within limits that may not exceed the maximum withstand capability of various users (e.g., users that may demand or use energy, and users that may provide energy generation). For example, control systems of power plants may have limits for operating stably with high RoCoF and embedded generators may use RoCoF based island detection and Loss of Mains (LOM) protection which may be set to a prescribed RoCoF setting (e.g., between 0.5 Hz/s to 2.5 Hz/s). If the initial RoCoF exceeds these limits, then generators may trip inadvertently in a cascading manner causing further frequency instability and in the worst case lead to a system collapse. In addition, certain demand units (e.g., devices of consumers that may demand or use energy) operating under demand response active power control with a set value of RoCoF may disconnect (e.g., from the electrical grid) if the RoCoF exceeds a set value. A frequency control to address RoCoF following a disturbance may benefit from a response time within a time limit (e.g., under 1 second).

To address the above challenges and other challenges, disclosed embodiments may provide frequency control for limiting the initial RoCoF (e.g., following a disturbance in the electrical grid).

Disclosed embodiments may relate to systems and methods directed to synthetic inertia for an energy system, for example, by controlling the output power of energy storage unit(s) coupled to an electrical grid based on the measured rate of change of the frequency of the electrical grid, to help maintain the stability of the frequency of the electrical grid, as described in greater detail herein.

FIG. 1 shows an example system 100 for managing an energy system, consistent with some embodiments of the present disclosure. The system 100 may include at least one energy storage system 110, at least one energy storage controller device 118, one or more power lines (e.g., 114, 116), one or more transformers (e.g., 124, 126), and/or one or more sensors (e.g., 120, 122). The energy storage system 110 may include one or more energy storage units (e.g., 112A, 112B, and 112C).

The energy storage system 110, the energy storage unit(s) of the energy storage system 110 (e.g., the energy storage units 112A, 112B, and 112C), the energy storage controller device 118, the sensors 120, 122, and/or other devices may be connected with each other via a network (e.g., using interconnected communication links). The network may include one or more of any of various types of networks for communication of information, such as a cellular network (e.g., 2G, 3G, 4G, or 5G), a satellite network, a Wi-Fi network, a WiMAX network, a Bluetooth network, a near-field communication (NFC) network, a low-power wide-area networking (LPWAN) network, a mobile network, a terrestrial microwave network, a wireless ad hoc network, an Ethernet network, a telephone network, a power-line communication (PLC) network, a coaxial cable network, an optical fiber network, and/or the like. The network may include a wired network or a wireless network. The network may include a personal area network, a local area network, a metropolitan area network, a wide area network, a global area network, a space network, or any other type of computer network that may use data connections between network nodes. In some examples, the network may include an Internet Protocol (IP) based network.

The energy storage system 110 may refer to any system configured to store energy. The energy storage system 110 may include a centralized system or a distributed system. The energy storage system 110 may include one or more energy storage units (e.g., 112A, 112B, and 112C). In some examples, the energy storage units 112A, 112B, 112C may be located in a single physical location, such as a site. In some examples, the energy storage units 112A, 112B, 112C may be distributed in multiple physical locations. The energy storage units 112A, 112B, 112C may be interconnected via a network capable of exchanging data and/or energy between the energy storage units 112A, 112B, 112C, and may be configured to function as a system. Although only three energy storage units 112A, 112B, 112C have been described above, it is contemplated that the energy storage system 110 may include any number of energy storage units.

The energy storage system 110 may be coupled to one or more power lines (e.g., the power lines 114, 116). In some examples, the power lines 114, 116 may be associated with an electrical grid. In some examples, the power lines 114, 116 may be associated with a power station (e.g., a photovoltaic power station, a solar farm, a wind power station, a wind farm, a hydroelectric power station). In some examples, the power lines 114, 116 may be associated with any type of facility (e.g., a building, a factory, a hospital, a school, an airport, or any other entity that uses energy). The energy storage system 110 may receive energy via the power lines 114, 116 and may store the received energy, and/or may output energy to the power lines 114, 116. For example, the energy storage system 110 may include a grid energy storage within an electrical power grid (e.g., an energy storage that may be configured to store electrical energy when electricity is plentiful in an electrical power grid and may be configured to output electrical energy to the electrical power grid when demand for electricity is high). The energy storage system 110 may store electrical energy when demand for electricity is low and may output electrical energy to the grid when demand for electricity is high. As another example, the energy storage system 110 may be located next to a solar farm and may be configured to receive electrical energy from the solar farm and store the electrical energy for output at a later time. As another example, the energy storage system 110 may be located next to a facility and may be configured to store electrical energy and to provide electrical energy to the facility at an appropriate time.

The energy storage system 110, including the energy storage units 112A, 112B, 112C may store energy in one or more of various forms, such as electrochemical, chemical, mechanical, electrical, electromagnetic, biological, and/or thermal. In some examples, the energy storage system 110 including the energy storage units 112A, 112B, 112C may store energy using rechargeable batteries. In some examples, an energy storage unit (e.g., 112A, 112B, 112C) may include any of various types of energy storage systems that may be connected to the electrical grid through power conversion systems (e.g., flywheel energy storage). An example of an energy storage unit is described in greater detail in connection with FIG. 3.

The energy storage system 110 may be coupled to the power lines 114, 116 via the transformers 124, 126. A transformer may refer to, for example, a component that may transfer electrical energy from one electrical circuit to another electrical circuit or multiple electrical circuits. A transformer may include core(s) and/or winding(s) around the core(s). A transformer may be used to change voltage levels of alternating current. A transformer of a step-up type may be used to increase the voltage level, and a transformer of a step-down type may be used to decrease the voltage level. The energy storage system 110 may be coupled to the power line 114 via the transformer 124. The power line 114 may be coupled to the power line 116 via the transformer 126. The transformers 124, 126 may include any type of transformer as desired for the transmission, distribution, and/or utilization of electrical energy (e.g., alternating current).

The energy storage system 110 and the power lines 114, 116 may be associated with different voltage levels. The transformers 124, 126 may be configured to transfer energy among the energy storage system 110 and the power lines 114, 116. The energy storage system 110 and the power lines 114, 116 may have any desired voltage level. For example, input or output connection points of the energy storage system 110 may be configured to input or output electricity at a first voltage level (e.g., as coupled to the transformer 124), the power line 114 may be configured to transmit electricity at a second voltage level different from the first voltage level, and the power line 116 may be configured to transmit electricity at a third voltage level different from the first voltage level and the second voltage level. The first, second, and/or third voltage levels may be classified or categorized in any desired manner (e.g., according to various standards setting organizations or other entities, or based on standards or rules that may evolve or change over time). In some examples, the power line 114 may include a medium voltage section of an electrical grid (e.g., 30 kilovolts, 50 kilovolts, etc.), and the power line 116 may include a high voltage section of the electrical grid (e.g., 150 kilovolts, 200 kilovolts, etc.). For example, medium voltage levels may include 34.5 kV or 69 kV for 60 Hz systems, and 33 kV or 66 kV for 50 Hz systems. As another example, high voltage levels may include 110 kV or 230 kV. Additionally or alternatively, the power lines 114, 116 may be associated with other voltage sections of an electrical grid as classified or categorized in any desired manner (e.g., a low voltage section (e.g., 1 kilovolts, 2 kilovolts, etc.), an extra-high voltage section (e.g., 500 kilovolts, 700 kilovolts, etc.), an ultra-high voltage section (e.g., 1,100 kilovolts, etc.), and/or the like). Although two power lines 114, 116 and two transformers 124, 126 are described above, it is contemplated that the system 100 may include any number of power lines operating with any desired voltage levels, and may include any number of transformers configured to transfer energy between power lines and/or between a power line and the energy storage system 110.

In some examples, the power lines 114, 116 may be associated with (e.g., may be connected to, or may include) busbars of differing levels of voltage. For example, the busbars may function as points of connection between power lines, transformers, sensors (e.g., 120, 122), and/or other suitable components. For example, via a busbar (e.g., 33 kV), the power line 114 may be connected with the transformer 124, the transformer 126, and/or the sensor 120. And via a busbar (e.g., 400 kV), the power line 116 may be connected with the transformer 126 and/or the sensor 122. In some examples, components or elements downstream of the power line 116 or its associated busbar which are shown in FIG. 1 may be located at a site for the energy storage system.

In some examples, there may be multiple low-voltage/medium-voltage transformers (e.g., the transformer 124) and each of the transformers may have a medium voltage cable connecting to the busbar associated with the power line 114. In some examples, there may be one or two medium-voltage/high-voltage grid transformers (e.g., the transformer 126) and there may be cables that may connect the medium-voltage/high-voltage transformers to the busbar associated with the power line 116. The power line 116 may represent the external grid. In some examples, a corresponding medium-voltage/low-voltage transformer (e.g., the transformer 124) may be available for each of the energy storage units 112A, 112B, 112C, respectively (e.g., the transformers and/or energy storage units may not be connected on the low voltage level).

The energy storage controller device 118 may include any type of computing device configured to perform one or more of the functions described herein (e.g., for synthetic inertia for energy systems). For example, the energy storage controller device 118 may include at least one processor and at least one memory storing instructions that, when executed by the at least one processor, cause the at least one processor to perform one or more of the functions described herein. The energy storage controller device 118 may include, for example, an embedded system, a computer, a laptop computer, a desktop computer, a mainframe computer, a tablet, a smart phone, a mobile phone, a mobile device, a server device, a client device, an automotive electronics device, an extended reality headset, a smart watch, an Internet of things (IoT) device, or any other type of computing device. In some examples, the energy storage controller device 118 may be configured to receive data from various sources (e.g., via a network) and/or to manage the energy storage system 110 (e.g., by sending instructions to the energy storage system 110). For example, the energy storage controller device 118 may receive measurement data from the sensors 120, 122, and/or operational data from the energy storage units 112A, 112B, 112C. Based on received data, the energy storage controller device 118 may manage the energy storage system 110. For example, as described in greater detail herein, the energy storage controller device 118 may receive or determine a rate of change of a frequency of alternating current of an electrical grid and configure, based on the rate of change of the frequency, an output power of the energy storage system 110. For example, the rate of change of the frequency may be used to determine an adjusted output power of the energy storage unit(s) coupled to the electrical grid. Adjusting the output power of the energy storage unit(s) based on the rate of change of the frequency may help maintain the stability of the frequency of the electrical grid (e.g., by contributing to balancing the supply and demand of electrical energy in the electrical grid). Although one energy storage controller device 118 and one energy storage system 110 are illustrated in FIG. 1 and described above, it is contemplated that the system 100 may include any number of energy storage controller devices and may include any number of energy storage systems.

The sensors 120, 122 may include any type of sensor configured to measure one or more aspects associated with the system 100. The sensors 120, 122 may include, for example, voltage sensors, current sensors, frequency sensors (e.g., power line frequency sensors), power sensors (e.g., for measuring the active power or reactive power of an electrical grid), or other types of sensors for obtaining measurements associated with the system 100. The sensors 120, 122 may have any desired configuration (e.g., shape, size, weight, functionality, etc.). The sensors 120, 122 may be configured to obtain measurements of an electrical grid (e.g., including the power lines 114, 116). For example, the sensor 120 may be configured to measure the frequency of alternating current as transmitted via the power line 114 (e.g., the voltage at the busbar associated with or included in the power line 114), and the sensor 122 may be configured to measure the frequency of alternating current as transmitted via the power line 116 (e.g., the voltage at the busbar associated with or included in the power line 116). The sensors 120, 122 may be coupled to the electrical grid in any desired manner (e.g., by electrically coupling to the points of connection of the electrical grid). The sensors 120, 122 may send measured data to the energy storage controller device 118. Although two sensors 120, 122 are illustrated in FIG. 1 and described above, it is contemplated that the system 100 may include any number of sensors.

Figure 2:
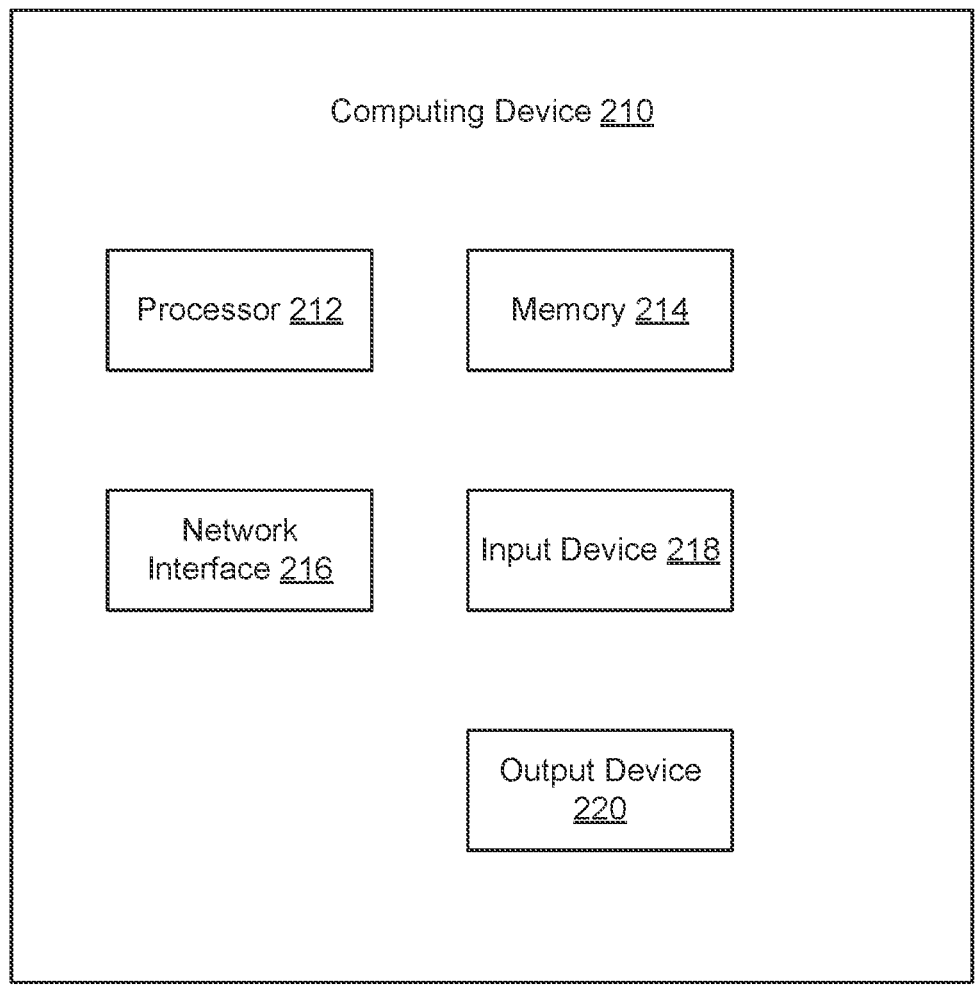
FIG. 2 shows an example computing device, consistent with some embodiments of the present disclosure.

FIG. 2 shows an example computing device 210, consistent with some embodiments of the present disclosure. The computing device 210 may include, for example, at least one processor 212, at least one memory 214, at least one network interface 216, at least one input device 218, and/or at least one output device 220. The devices as described herein (e.g., the energy storage controller device 118 shown in FIG. 1, the sensors 120, 122 shown in FIG. 1, and/or the computing device 312 shown in FIG. 3) may similarly include these components and/or may be implemented in a similar manner as the computing device 210. In some examples, the computing device 210 including one or more of the components may be implemented using virtualization technologies and/or cloud computing technologies.

The processor 212 may execute instructions of a computer program to perform any of the functions described herein. The processor 212 may include, for example, integrated circuits, microchips, microcontrollers, microprocessors, central processing units (CPUs), graphics processing units (GPUs), digital signal processors (DSPs), field programmable gate arrays (FPGAs), or other units suitable for executing instructions or performing logic operations. The processor 212 may include a single-core or multiple-core processor (e.g., dual-core, quad-core, or with any desired number of cores). The processor 212 may provide the ability to execute, control, run, or store multiple processes, applications, or programs. In some examples, the processor 212 may be configured to provide parallel processing functionalities to allow a device associated with the processor to execute multiple processes simultaneously. In some examples, the processor 212 may be configured with virtualization technologies. Other types of processor arrangements may be implemented to provide the capabilities described herein.

The memory 214 may include a non-transitory computer-readable medium that may store instructions that, when executed by at least one processor, cause the at least one processor to perform one or more processes as described herein. A non-transitory computer-readable medium may include any type of physical memory on which information or data readable by at least one processor may be stored. A non-transitory computer-readable medium may include, for example, random access memory (RAM), read-only memory (ROM), compact disc read-only memory (CD-ROM), digital versatile discs (DVDs), programmable read-only memory (PROM), erasable programmable read-only memory (EPROM), non-volatile random-access memory (NVRAM), volatile memory, non-volatile memory, hard drives, flash drives, disks, caches, registers, an optical data storage medium, a physical medium with patterns, or networked versions thereof. A non-transitory computer-readable medium may include multiple structures and may be located at a local location or at a remote location.

The network interface 216 may include, for example, a network card, a modem, and/or the like, and may be configured to provide data communication (e.g., two-way data communication) with a network. The network interface 216 may be a wireless interface, a wired interface, or a combination of the two. The specific design and implementation of the network interface 216 may depend on the communication network via which the computing device 210 is intended to operate. For example, the network interface 216 may include a Wireless Local Area Network (WLAN) card, an Integrated Services Digital Network (ISDN) card, a cellular modem, a satellite modem, a modem configured to provide data communication connections via the Internet, a network card with an Ethernet port, a device with radio frequency receivers and transmitters, a device with optical receivers and transmitters, and/or the like. The network interface 216 may be designed to operate via any type of desired network. The network interface 216 may be configured to send and receive electrical, electromagnetic, or optical signals that may represent various types of data.

The input device 218 may include, for example, a keyboard, a mouse, a touch pad, a touch screen, one or more buttons, a joystick, a microphone, and/or any other device configured to detect and/or receive input. In some examples, the input device 218 may include one or more of various types of sensors, such as an image sensor, a temperature sensor, a humidity sensor, a location sensor, or any other type of sensor. The output device 220 may include, for example, a light indicator, a light source, a display (e.g., a light-emitting diode (LED) display, an organic light-emitting diode (OLED) display, a liquid-crystal display (LCD), or a dot-matrix display), a screen, a touch screen, a speaker, a headphone, a device configured to provide tactile cues, a vibrator, and/or any other device configured to provide output.

The memory 214 may store instructions that, when executed by at least one processor, cause the at least one processor to perform one or more processes as described herein. The instructions may include, for example, software instructions, computer programs, computer code, executable instructions, source code, machine instructions, machine language programs, or any other type of directions for a computing device. The instructions may be based on one or more of various types of desired programming languages, and may include (e.g., embody) various processes for synthetic inertia for energy systems as described herein.

Figure 3:
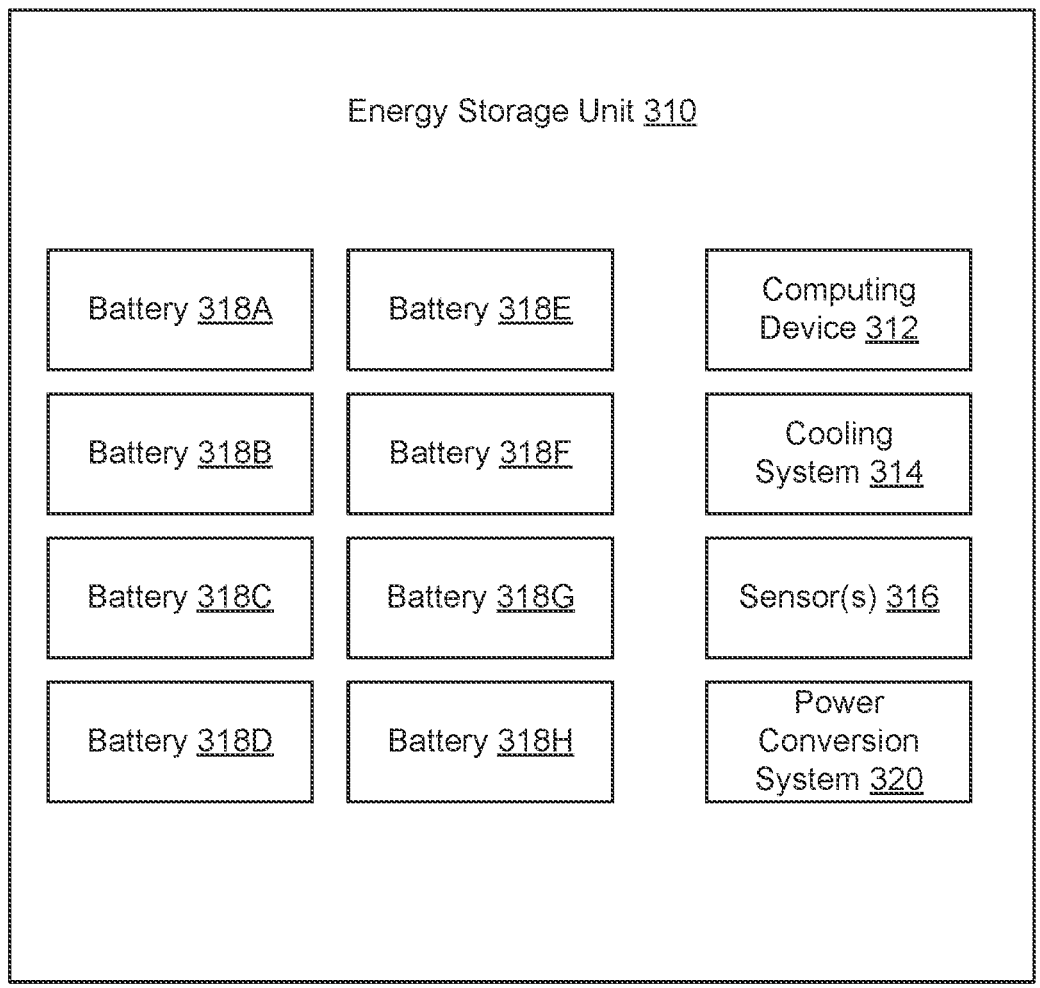
FIG. 3 shows an example energy storage unit, consistent with some embodiments of the present disclosure.

FIG. 3 shows an example energy storage unit 310, consistent with some embodiments of the present disclosure. The energy storage unit 310 may include, for example, a computing device 312, a cooling system 314, one or more sensors 316, a power conversion system 320, and/or one or more batteries (e.g., 318A-318H). The energy storage unit 310 may be an example of one or more of the energy storage units 112A, 112B, 112C. In some examples, the energy storage unit 310 may have an enclosure and the components of the energy storage unit 310 may be contained within the enclosure. The enclosure may be in any desired shape, and/or may be constructed using any desired material. For example, the enclosure may have a shape of a rectangular cuboid or a cube.

The computing device 312 may be implemented in a similar manner as the computing device 210. The computing device 312 may be local to the energy storage unit 310 (e.g., located within an enclosure of the energy storage unit 310). The computing device 312 may be configured to manage other components of the energy storage unit 310. The computing device 312 may, additionally or alternatively, be configured to communicate with another computing device (e.g., the energy storage controller device 118) for managing the energy storage unit 310. For example, the computing device 312 may transmit operational data of the energy storage unit 310 to the other computing device, may receive instructions from the other computing device, and/or may execute the received instructions.

A battery (e.g., any one of the batteries 318A-318H) may refer to an electric battery, and may include a source of electric power including one or more electrochemical cells with external connections. The batteries 318A-318H may be rechargeable, and may be discharged and recharged multiple times. The batteries 318A-318H may include one or more of various types of batteries, such as lithium-ion batteries, lithium iron phosphate batteries, silver-oxide batteries, nickel-zinc batteries, nickel metal hydride batteries, lead-acid batteries, nickel-cadmium batteries, lithium nickel manganese cobalt oxides (NMC) batteries, lithium nickel cobalt aluminium oxides (NCA) batteries, lithium ion manganese oxide (LMO) batteries, lithium cobalt oxide batteries, fuel cells, or other types of batteries. The energy storage unit 310 is illustrated to include the batteries 318A-318H, but a larger or smaller number of batteries may be included in the energy storage unit 310 as desired.

The batteries 318A-318H may have control components associated therewith. The control components may be, for example, configured to manage the charge and discharge of the batteries 318A-318H. The control components may include, for example, battery management systems (BMS). In some examples, each of the batteries 318A-318H may have its control component (e.g., a battery management system). The control component for each of the batteries 318A-318H may be implemented by a computing device, and/or may communicate with a central management component (e.g., for the energy storage unit 310 and implemented by the computing device 312). Additionally or alternatively, the central management component may manage the charge and discharge of the batteries 318A-318H collectively. The charge and discharge of the batteries 318A-318H may be controlled using appropriate techniques, such as circuits with switch controls, charge or discharge controllers, charge or discharge regulators, battery regulators, and/or the like, so that the batteries 318A-318H may be controlled to be in a state of receiving electricity from a source at a particular rate, in a state of outputting electricity to a load at a particular rate, or in a state of being idle.

The power conversion system 320 may refer to, for example, any system that may be configured to convert electric energy from one form to another form. For example, the power conversion system 320 may be configured to convert alternating current (AC) to direct current (DC), convert direct current to alternating current, convert alternating current to alternating current, convert direct current to direct current, and/or the like. In some examples, the power conversion system 320 may include DC to AC conversion (e.g., using a power inverter) and/or may include AC to DC conversion (e.g., using a rectifier). As one example, the batteries 318A-318H may output electrical energy in the form of direct current, which the power conversion system 320 may convert into alternating current (e.g., for supplying to a power line or electrical grid operating with alternating current). As another example, the power conversion system 320 may convert alternating current (e.g., received from a power line or electrical grid operating with alternating current) into direct current for inputting to or charging the batteries 318A-318H. Additionally or alternatively, the power conversion system 320 may include AC to AC conversion (e.g., using a transformer) and/or may include DC to DC conversion (e.g., using a linear regulator). The power conversion system 320 may be configured to convert electrical energy from the batteries 318A-318H into any suitable form for outputting (e.g., to a load), and/or may be configured to convert electrical energy from another source into a suitable form for inputting to or charging the batteries 318A-318H. For example, the power conversion system 320 may be used for coupling the batteries 318A-318H to a power line (e.g., the power lines 114, 116) or an electrical grid.

In some examples, the power conversion system 320 may include a structure or component that may be applicable to the batteries 318A-318H collectively. In some examples, the power conversion system 320 may include multiple structures or components each of which may be respectively applicable to a corresponding battery of the batteries 318A-318H. In some examples, the power conversion system 320 may include a structure or component that may be applicable to some batteries of the batteries 318A-318H collectively, and the power conversion system 320 may include multiple structures or components each of which may be respectively applicable to a corresponding battery of other batteries of the batteries 318A-318H. In some examples, a power conversion system may be used for multiple energy storage units (e.g., 112A, 112B, 112C) collectively (e.g., for converting electrical energy from the multiple energy storage units into a desired form for outputting to a load, or for converting electrical energy from a source into a desired form for inputting to or charging the multiple energy storage units).

The cooling system 314 may include any type of device configured to remove heat from the energy storage unit 310. The cooling system 314 may use air, liquid, solid material, gaseous material, and/or any other type of suitable medium or material to remove heat. In some examples, the cooling system 314 may include heat sinks and/or cooling fins. In some examples, the cooling system 314 may include fans (e.g., for moving air in air-cooling), pumps (e.g., for moving a liquid in liquid-cooling), compressors (e.g., for vapor-compression refrigeration), or any other type of device for cooling. The cooling system 314 may have any desired configuration (e.g., shape, size, weight, functionality, etc.), and/or may be placed, oriented, or distributed in association with the energy storage unit 310 in any desired manner. In some examples, each of the batteries 318A-318H may have its individually associated cooling element as part of the cooling system 314.

The one or more sensors 316 may include any type of sensor configured to gather information associated with (e.g., measure the operation of) the energy storage unit 310. For example, the sensor(s) 316 may include temperature sensors, humidity sensors, location sensors, current sensors, voltage sensors, frequency sensors, power sensors, and/or other types of sensors. The sensor(s) 316 may have any desired configuration (e.g., shape, size, weight, functionality, etc.), and/or may be placed, oriented, or distributed in association with the energy storage unit 310 in any desired manner. In some examples, each of the batteries 318A-318H may have its individually associated sensor(s). For example, each of the batteries 318A-318H may have an associated power sensor configured to measure an input power or output power of that battery. As another example, each of the batteries 318A-318H may have an associated temperature sensor configured to measure a temperature of that battery. In some examples, the energy storage unit 310 may include sensor(s) that may be applicable to the batteries 318A-318H collectively. For example, the set of batteries 318A-318H may have a power sensor configured to measure an aggregate input power or aggregate output power of all the batteries 318A-318H. As another example, the set of batteries 318A-318H may have an airflow sensor configured to measure a flow rate of air across all the batteries 318A-318H.

The computing device 312 may communicate with and control the batteries 318A-318H (e.g., via a control component for each battery), the cooling system 314, the sensor(s) 316, and the power conversion system 320. In some examples, the computing device 312 may control the components based on instructions from another computing device (e.g., the energy storage controller device 118). Additionally or alternatively, data associated with the energy storage unit 310 may be recorded or stored, including, for example, data measured by the sensor(s) 316, data used by the energy storage unit 310 (e.g., parameters for controlling the batteries 318A-318H, parameters for controlling the power conversion system 320, or parameters for controlling the cooling system 314), or any other type of data. The recorded or stored data may be used or processed by the computing device 312 and/or another computing device (e.g., the energy storage controller device 118) in connection with one or more aspects described herein.

Disclosed embodiments, including methods, systems, apparatuses, and non-transitory computer-readable media, may relate to synthetic inertia for energy systems. An energy system may include, for example, any system associated with the generation, transmission, conversion, distribution, storage, and/or usage of energy (e.g., electrical energy) and/or associated with any other aspect of energy. As one example, an energy system may include an electrical grid. An electrical grid may include, for example, an interconnected network for electricity delivery from producers to consumers. An electrical grid may include, for example, power stations (e.g., thermal power stations, photovoltaic power stations, solar farms, wind power stations, wind farms, hydroelectric power stations, etc.), substations (e.g., for transforming voltage from higher to lower or from lower to higher, or for performing other functions associated with transmitting electrical energy between producers and consumers), electrical power transmission and/or distribution (e.g., transmitting electrical energy from producers to substations, and/or delivering electrical energy from a transmission system to consumers), and/or other suitable components.

Inertia in an electrical grid may include, for example, the kinetic energy stored in spinning generators and/or motors in the electrical grid (e.g., at power stations, industrial facilities, or other facilities), for example, as the generators and/or motors may rotate in a synchronized manner (e.g., at a frequency of the electrical grid or at other associated frequencies). The inertia in the electrical grid may help maintain the stability of the frequency of the electrical grid. Energy sources such as batteries, photovoltaic power stations, solar farms, energy sources configured to output energy using power inverters, or other types of energy sources may not include rotating generators and/or motors. Synthetic inertia for an electrical grid may include, for example, controlling these types of energy sources in a manner that may help maintain the stability of the frequency of the electrical grid, as described in greater detail below.

Disclosed embodiments include a system including: one or more energy storage units coupled to an electrical grid; and a computing device including at least one processor and at least one memory storing instructions that, when executed by the at least one processor, cause the computing device to perform one or more functions as described herein. An energy storage unit may refer to a physical object for storing energy. An energy storage unit may store energy in one or more of various forms, such as electrochemical, chemical, mechanical, electrical, electromagnetic, biological, and/or thermal. In some examples, an energy storage unit may store energy using rechargeable batteries. An example of an energy storage unit is described in connection with FIG. 3. In some examples, the one or more energy storage units may include one or more battery units. In some examples, each battery unit of the one or more battery units may include an enclosure including a plurality of batteries. The enclosure may be in any desired shape, and/or may be constructed using any desired material. For example, the enclosure may have a shape of a rectangular cuboid or a cube. An electrical grid may include, for example, an interconnected network for electricity delivery from producers to consumers. An electrical grid may include, for example, power stations (e.g., thermal power stations, photovoltaic power stations, solar farms, wind power stations, wind farms, hydroelectric power stations, etc.), substations (e.g., for transforming voltage from higher to lower or from lower to higher, or for performing other functions associated with transmitting electrical energy between producers and consumers), electrical power transmission and/or distribution (e.g., transmitting electrical energy from producers to substations, and/or delivering electrical energy from a transmission system to consumers), and/or other suitable components.

The one or more energy storage units may be coupled to the electrical grid. For example, the one or more energy storage units (e.g., 112A, 112B, 112C) may be coupled to one or more power lines of the electrical grid (e.g., power lines 114, 116). The coupling of the one or more energy storage units to the electrical grid may be via power conversion systems (e.g., transformers, power inverters, rectifiers, linear regulators, etc.). As one example, the one or more energy storage units may output alternating current of a first voltage, and a transformer may receive the alternating current of the first voltage and may output alternating current of a second voltage (e.g., higher than the first voltage) to a power line of the electrical grid. As another example, a transformer may receive alternating current of a third voltage from a power line of the electrical grid and may output alternating current of a fourth voltage (e.g., lower than the third voltage) to the one or more energy storage units.

Disclosed embodiments include obtaining a rate of change of a frequency of alternating current of the electrical grid. Alternating current may refer to, for example, an electric current which may periodically reverse its direction and change its magnitude continuously with time (e.g., in contrast to direct current which may flow only in one direction). Alternating current may be transmitted via the electrical grid (e.g., in the form of three-phase electric power). The frequency of alternating current may include, for example, the frequency of the oscillations of alternating current. The alternating current transmitted via the electrical grid may have a nominal frequency (e.g., 50 Hertz or 60 Hertz). The actual frequency of the alternating current as transmitted via the electrical grid may change (e.g., increase or decrease), for example, due to changes in the supply and demand of the electrical energy and/or other reasons. The actual frequency of the alternating current as transmitted via the electrical grid and/or the rate of change of the actual frequency may be measured by sensor(s), metering unit(s), and/or other suitable device(s).

In some embodiments, obtaining the rate of change of the frequency includes one or more of: receiving the rate of change of the frequency from a metering unit; or receiving measurements of the frequency and calculating the rate of change of the frequency based on the measurements of the frequency. As one example, obtaining the rate of change of the frequency may include receiving the rate of change of the frequency from a metering unit. The metering unit may refer to any sensor or device configured to measure a rate of change of the frequency of alternating current of the electrical grid. For example, the metering unit may be configured to measure the frequency of the alternating current of the electrical grid and calculate the rate of change of the frequency based on the measurement(s) of the frequency (e.g., as described elsewhere herein). The metering unit may be configured to measure the rate of change of the frequency in other ways as desired. A computing device (e.g., the energy storage controller device 118, computing device(s) in the energy storage units 112A, 112B, 112C, the computing device 210, the computing device 312, or any other computing device) may be configured to receive the rate of change of the frequency as measured and/or calculated, from the metering unit.

Figure 4:
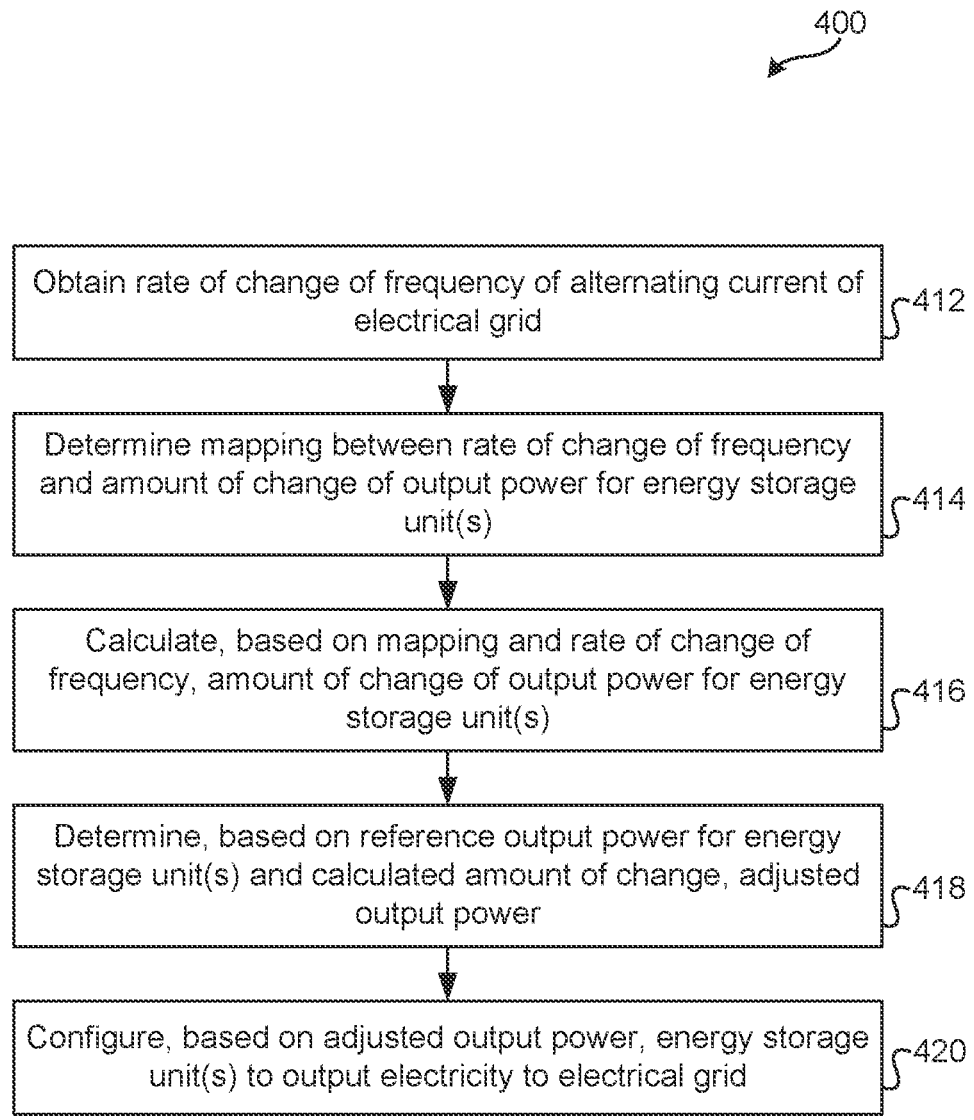
FIG. 4 shows a flowchart of an example method for synthetic inertia for energy systems, consistent with some embodiments of the present disclosure.

In some embodiments, the rate of change of the frequency is based on measurements obtained at one or more of: a high voltage section of the electrical grid; or a medium voltage section of the electrical grid. For example, the metering unit may be connected to a high voltage section of the electrical grid or a medium voltage section of the electrical grid (e.g., as described elsewhere herein), and may be configured to measure the rate of change of the frequency from the connected section. FIG. 4 shows a flowchart of an example method 400 for synthetic inertia for energy systems, consistent with some embodiments of the present disclosure. With reference to FIG. 4, in step 412, a computing device may obtain a rate of change of a frequency of alternating current of the electrical grid.

As another example, obtaining the rate of change of the frequency may include receiving measurements of the frequency and calculating the rate of change of the frequency based on the measurements of the frequency. For example, disclosed embodiments may include receiving measurements of a frequency of alternating current of the electrical grid for a plurality of time intervals. A computing device (e.g., the energy storage controller device 118, computing device(s) in the energy storage units 112A, 112B, 112C, the computing device 210, the computing device 312, or any other computing device) may be configured to receive the measurements from one or more sensors (e.g., sensors 120, 122) coupled to the electrical grid. The sensor(s) may include, for example, voltage sensors, current sensors, frequency sensors (e.g., power line frequency sensors), power sensors (e.g., for measuring the active power or reactive power of an electrical grid), or other types of sensors for obtaining measurements associated with the electrical grid. The sensor(s) may have any desired configuration (e.g., shape, size, weight, functionality, etc.). The sensor(s) may be coupled to power lines, points of connection, or other suitable locations within the electrical grid to measure the frequency of the electrical grid.

In some examples, the measurements may include, for example, a time series of data points of the frequency of alternating current of the electrical grid. The sensor(s) may measure the frequency of alternating current of the electrical grid, for example, for a plurality of time intervals. Each of the time intervals may have any desired length (e.g., 1 millisecond, 2 milliseconds, 5 milliseconds, 10 milliseconds, 20 milliseconds, 50 milliseconds, 100 milliseconds, 200 milliseconds, 500 milliseconds, or any other desired time length). Additionally or alternatively, the sensor(s) may periodically or continuously measure the frequency of alternating current of the electrical grid, and may thus obtain the measurement data of the frequency (e.g., a time series of data points of the frequency). In some examples, the sensor(s) may include frequency sensors that may be configured to measure the frequency of alternating current of the electrical grid. In some examples, the sensor(s) may include voltage sensors that may be configured to measure the voltage levels of alternating current of the electrical grid. The voltage measurements may be used to, for example, determine a waveform signal of the voltage levels and thereby calculate the frequency of alternating current of the electrical grid. For example, the zero crossing of the voltage measurements may be used to determine the frequency of alternating current of the electrical grid. In some examples, the sensor(s) may include current sensors configured to measure the amounts of current of the electrical grid, which may be used to determine the frequency of alternating current of the electrical grid (e.g., based on a waveform signal of the measurements of the current).

In some embodiments, the measurements may be obtained at one or more of: a high voltage section of the electrical grid; or a medium voltage section of the electrical grid. The electrical grid may be classified or categorized into various voltage sections (e.g., the high voltage section, the medium voltage section, etc.) in any desired manner (e.g., according to various standards setting organizations or other entities, or based on standards or rules that may evolve or change over time). In some examples, a power line of the electrical grid may include a medium voltage section of the electrical grid (e.g., 30 kilovolts, 50 kilovolts, etc.), and another power line of the electrical grid may include a high voltage section of the electrical grid (e.g., 150 kilovolts, 200 kilovolts, etc.). Additionally or alternatively, the electrical grid may include other voltage sections as classified or categorized in any desired manner (e.g., a low voltage section (e.g., 1 kilovolts, 2 kilovolts, etc.), an extra-high voltage section (e.g., 500 kilovolts, 700 kilovolts, etc.), an ultra-high voltage section (e.g., 1,100 kilovolts, etc.), and/or the like). For example, a sensor (e.g., the sensor 122) may be coupled to the high voltage section of the electrical grid (e.g., the power line 116, or a busbar associated with or included in the power line 116), may measure the frequency of alternating current as transmitted via the high voltage section, and may send the measurements to the computing device. Additionally or alternatively, a sensor (e.g., the sensor 120) may be coupled to the medium voltage section of the electrical grid (e.g., the power line 114, or a busbar associated with or included in the power line 114), may measure the frequency of alternating current as transmitted via the medium voltage section, and may send the measurements to the computing device.

Disclosed embodiments may include calculating, based on the measurements, a rate of change of the frequency. The computing device may, for example, receive the frequency measurements (e.g., a time series of data points) from the sensor(s) and use the frequency measurements to calculate a rate of change of the frequency of the alternating current transmitted via the electrical grid. In some examples, the rate of change of the frequency may be calculated by determining a ratio of a frequency change between two frequency measurements to the time length between the two frequency measurements. In some examples, the rate of change of the frequency may be calculated by dividing a frequency change between two frequency measurements by the time length between the two frequency measurements. The two frequency measurements may have any desired time length in between (e.g., 1 millisecond, 2 milliseconds, 5 milliseconds, 10 milliseconds, 20 milliseconds, 50 milliseconds, 100 milliseconds, 200 milliseconds, 500 milliseconds, or any other desired time length). For example, a most recent measurement of the frequency (e.g., as obtained in real time from a sensor) may be compared with a previous measurement of the frequency (e.g., which may have any desired time length apart from the most recent measurement) to determine the rate of change of the frequency. The rate of change of the frequency may indicate, for example, a frequency change (e.g., as measured in real time) divided by the time span or length between the frequency measurements indicating the frequency change.

Disclosed embodiments may include calculating the rate of change of the frequency by: calculating a frequency difference between two measurements of the measurements of the frequency; calculating a time difference between time stamps for the two measurements; and calculating a value of the frequency difference divided by the time difference, the value corresponding to the rate of change of the frequency. For example, the measurements of the frequency may include a time series of data points of the frequency of the electrical grid as measured by sensor(s). Two measurements of the frequency (e.g., two data points in the time series) may indicate two measured values of the frequency, and may be associated with time stamps for measuring the frequency (e.g., the time instances or intervals at or during which the frequency is measured by a sensor). A frequency difference between the two measurements may be calculated, for example, by subtracting a newly measured value of the frequency by a previously measured value of the frequency. A time difference between the two measurements may be calculated, for example, by subtracting the time stamp for a most recent measurement of the frequency by the time stamp for a previous measurement of the frequency. The rate of change of the frequency may correspond to the frequency difference as divided by the time difference. The two measurements of the frequency may have any desired time length in between (e.g., 1 millisecond, 2 milliseconds, 5 milliseconds, 10 milliseconds, 20 milliseconds, 50 milliseconds, 100 milliseconds, 200 milliseconds, 500 milliseconds, or any other desired time length). In some examples, the rate of change of the frequency may be determined in real time, as the computing device may receive in real time the measurements of the frequency of the electrical grid newly obtained by a sensor.

In some examples, a sliding time window may be used for determining the rate of change of the frequency. For example, the sliding time window may be applied to the frequency measurements (e.g., a time series of data points). The sliding time window may have any desired time length (e.g., 1 millisecond, 2 milliseconds, 5 milliseconds, 10 milliseconds, 20 milliseconds, 50 milliseconds, 100 milliseconds, 200 milliseconds, 500 milliseconds, or any other desired time length), and may advance in time to include the most recent frequency measurement and any previous frequency measurement(s) that may be less than or equal to the time length of the sliding time window apart from the most recent frequency measurement. The rate of change of the frequency may be calculated based on the frequency measurements (e.g., data points) included in the sliding time window. For example, the rate of change of the frequency may be an average rate of change of the frequency in the sliding time window, a maximum rate of change of the frequency in the sliding time window, a minimum rate of change of the frequency in the sliding time window, a median rate of change of the frequency in the sliding time window, or any other suitable value or metric indicating a rate of change of the frequency in the sliding time window.

Disclosed embodiments include determining a mapping between the rate of change of the frequency and an amount of change of output power for the one or more energy storage units. The rate of change of the frequency of alternating current as transmitted via the electrical grid may trigger a change of the output power for the one or more energy storage units coupled to the electrical grid, to help slow, or reduce the magnitude of, the rate of change of the frequency of the electrical grid and/or maintain the frequency of the electrical grid (e.g., to the nominal frequency of the electrical grid). The mapping between the rate of change of the frequency and the amount of change of output power for the one or more energy storage units may be represented, for example, using a mathematical function, using a table, or using any other suitable method that may associate each of a plurality of values for the rate of change of the frequency with a corresponding value for the amount of change of output power for the one or more energy storage units. The mapping may be configured, for example, by an operator or administrator of the one or more energy storage units. The mapping may be stored in a data storage, and may be accessed by the computing device for use. In addition, one or more methods for determining parameters of the mapping are described in greater detail in connection with FIGS. 6-10. In some examples, the mapping may be determined using other suitable methods, such as empirical measurements, computer model simulations, mathematical functions, and/or machine learning models.

Figure 5:
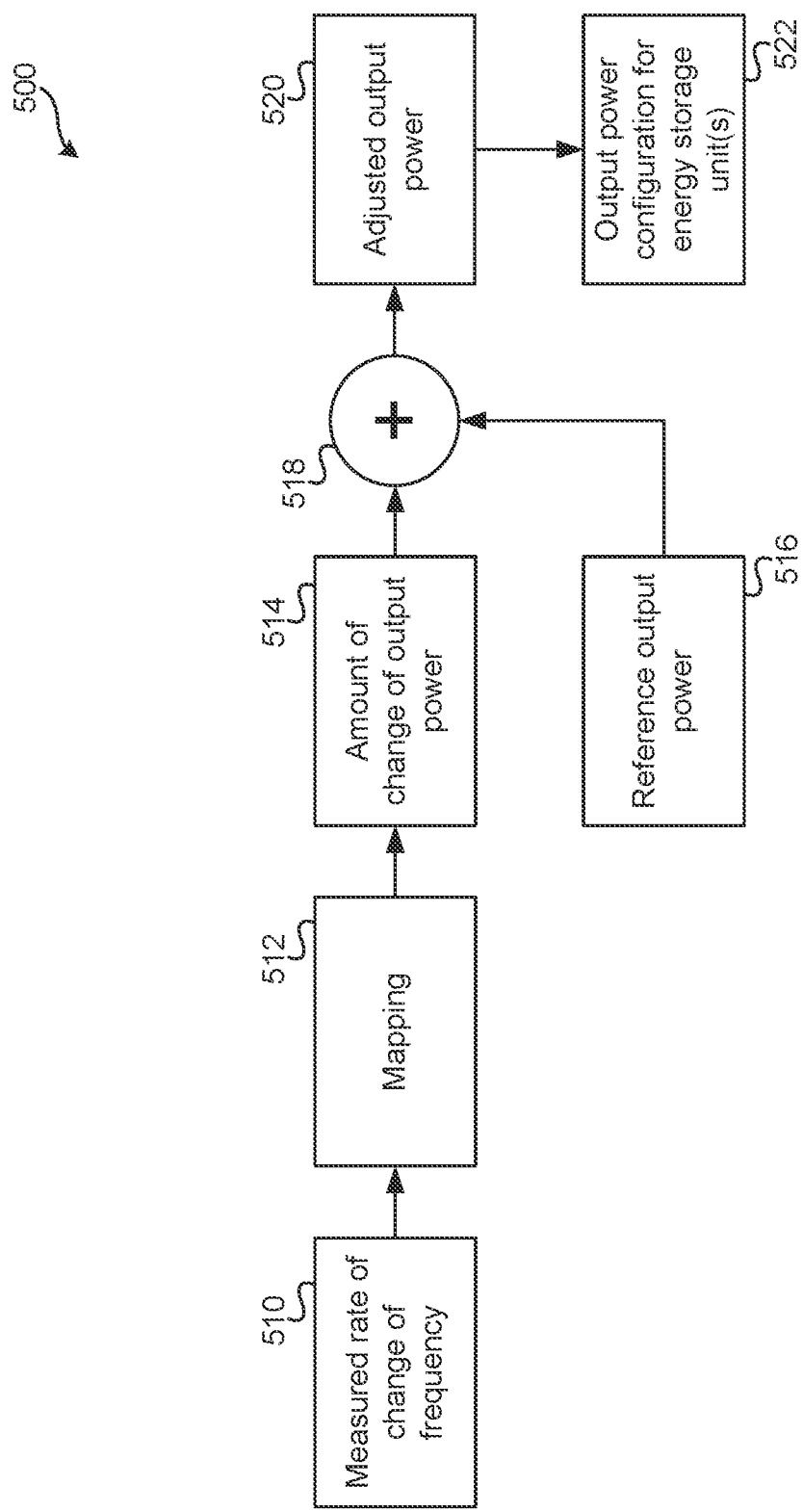
FIG. 5 shows a diagram of example processes for synthetic inertia for energy systems, consistent with some embodiments of the present disclosure.

With reference to FIG. 4, in step 414, the computing device may determine a mapping between the rate of change of the frequency and an amount of change of output power for the one or more energy storage units. FIG. 5 shows a diagram of example processes 500 for synthetic inertia for energy systems, consistent with some embodiments of the present disclosure. With reference to FIG. 5, a measured rate of change of the frequency (e.g., of alternating current transmitted via the electrical grid) in block 510 may be input to a mapping 512. The mapping 512 may indicate a correspondence between a rate of change of the frequency and an amount of change of output power for the one or more energy storage units coupled to the electrical grid.

In some examples, the mapping may be based on a ratio applicable to a range of the rate of change of the frequency. For example, the mapping may include multiplying the rate of change of the frequency by the ratio, if the rate of change of the frequency falls within the range. The range may have any desired values for its outer bounds and/or may be specified by an operator or administrator of the one or more energy storage units. As one example, if a measured rate of change of the frequency falls within the range, the measured rate may be multiplied by the ratio, and the product of the multiplication may correspond to the amount of change of output power for the one or more energy storage units. In some examples, the product of the multiplication may be added by a constant value (e.g., as configured by an operator or administrator of the one or more energy storage units), and the sum resulted from the addition may correspond to the amount of change of output power for the one or more energy storage units.

In some embodiments, the mapping includes a plurality of ratios, and each ratio of the plurality of ratios is a constant value applicable to a particular range of a plurality of ranges of the rate of change of the frequency. For example, to calculate the amount of change of output power for the one or more energy storage units, the computing device may determine whether a measured rate of change of the frequency falls within any of the plurality of ranges. If the measured rate falls within a particular range, the computing device may determine the ratio applicable to or corresponding to that particular range. The determined ratio may be multiplied by the measured rate of change of the frequency, and the product of the multiplication may correspond to the amount of change of output power for the one or more energy storage units. In some examples, the product of the multiplication may be added by a constant value (e.g., which may be specific to the particular range, for example, as configured by an operator or administrator of the one or more energy storage units), and the sum resulted from the addition may correspond to the amount of change of output power for the one or more energy storage units. In some embodiments, the plurality of ranges are non-overlapping. For example, the plurality of ranges may be configured in such a manner that a measured rate of change of the frequency may not fall within more than one range of the plurality of ranges. As one example, each range of the plurality of ranges may not overlap with each other range of the plurality of ranges (e.g., the plurality of ranges may include, for example, [−1 Hz/s, −0.5 Hz/s), [−0.5 Hz/s, −0.1 Hz/s), (0.1 Hz/s, 0.5 Hz/s], (0.5 Hz/s, 1 Hz/s], etc.).

In some embodiments, each ratio of the plurality of ratios indicates a variation in an amount of change of the output power divided by a corresponding change in the rate of change of the frequency. For example, the ratio may indicate the extent to which the amount of change of the output power may change in response to a change in the rate of change of the frequency. The ratio may be considered as the slope of a linear function whose independent variable or input variable may be the rate of change of the frequency and whose dependent variable or output variable may be the amount of change of output power for the one or more energy storage units (e.g., where the set of inputs for the function or the domain of the function may be within a range). Based on the ratio, a measured rate of change of the frequency may be mapped to the amount of change of the output power, which may be used to adjust the output power of the energy storage unit(s) coupled to the electrical grid and/or help maintain the stability of the frequency of the electrical grid (e.g., by contributing to balancing the supply and demand of electrical energy in the electrical grid). In some embodiments, two or more of the plurality of ratios are different for different ranges of the rate of change of the frequency. For example, a first ratio (e.g., −20 MW·s/Hz) may be used for or applicable to a first range of the rate of change of the frequency (e.g., a first range of [−0.5 Hz/s, −0.1 Hz/s)), a second ratio (e.g., −10 MW·s/Hz) may be used for or applicable to a second range of the rate of change of the frequency (e.g., a second range of [−1 Hz/s, −0.5 Hz/s) being different from the first range), and the first ratio may be different from the second ratio.

In some embodiments, the mapping includes a piecewise linear function defining a relationship between the rate of change of the frequency and an amount of change of the output power for the one or more energy storage units. In some embodiments, a graph of the piecewise linear function includes a plurality of line segments having different values of slope. A piecewise linear function may include, for example, a function defined on a plurality of intervals on each of which the function may be a linear function. The independent variable or input variable of the piecewise linear function may include the rate of change of the frequency, and the dependent variable or output variable of the piecewise linear function may include the amount of change of the output power for the one or more energy storage units. A graph of the piecewise linear function may include a plurality of line segments (e.g., straight-line segments) having different values of slope. For example, a value of slope of a first line segment of the piecewise linear function may be different from a value of slope of a second line segment of the piecewise linear function. Examples of the mapping may be described in greater detail in connection with FIGS. 6-10.

Figure 6:
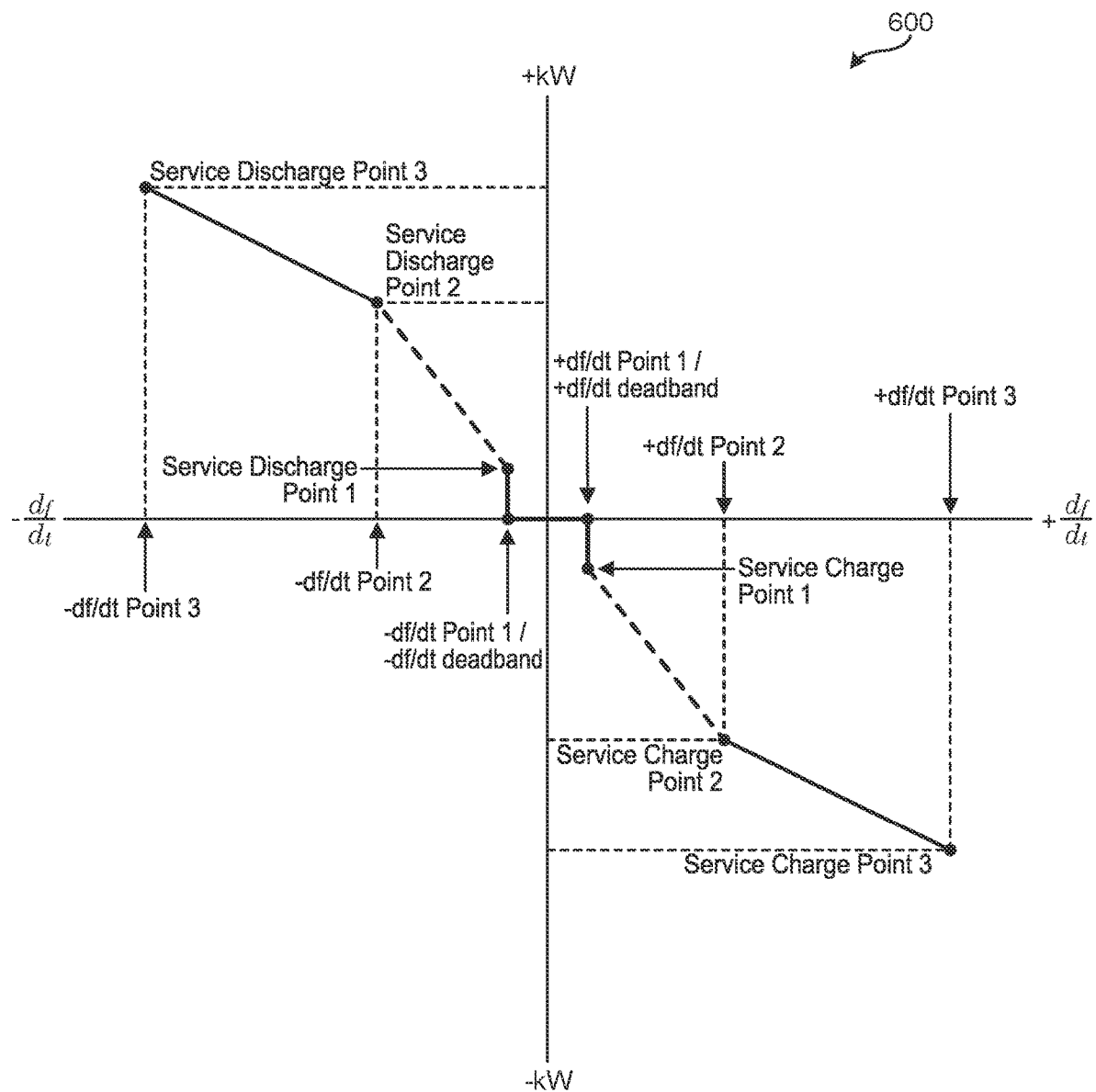
FIG. 6 shows a diagram of an example mapping, consistent with some embodiments of the present disclosure.

FIG. 6 shows a diagram 600 of an example mapping, consistent with some embodiments of the present disclosure. The measured df/dt value (e.g., the measured rate of change of the frequency) may serve as the input to the mapping, and the output of the mapping may include the amount of change of output power (e.g., active power) for the one or more energy storage units. The x-axis of the diagram 600 may indicate the rate of change of the frequency, and the y-axis of the diagram 600 may indicate the amount of change of output power for the one or more energy storage units. The mapping may be configurable (e.g., by an operator or administrator of the one or more energy storage units, and/or based on specifying the value(s) of one or more parameters of the mapping). In some examples, the maximum values and/or minimum values for one or more parameters of the mapping may be set (e.g., by an operator or administrator of the one or more energy storage units, and/or to indicate the outer bounds of the parameter(s) that may be used for the mapping). For example, the maximum values and/or minimum values for various parameters of the mapping may be configured as shown below in Table 1.

TABLE 1

| Parameter Name | Minimum value | Maximum value | Unit |
| --- | --- | --- | --- |
| −df/dt deadband | −3.0 | 0 | Hz/s |
| +df/dt deadband | 0 | 3.0 | Hz/s |
| −df/dt Point 1 | −3.0 | 0 | Hz/s |
| +df/dt Point 1 | 0 | 3.0 | Hz/s |
| −df/dt Point 2 | −3.0 | 0 | Hz/s |
| +df/dt Point 2 | 0 | 3.0 | Hz/s |
| −df/dt Point 3 | −3.0 | 0 | Hz/s |
| +df/dt Point 3 | 0 | 3.0 | Hz/s |
| Service Discharge Point 1 | 0 | 100% of nominal power | kW |
| Service Charge Point 1 | −100% of nominal power | 0 | kW |
| Service Discharge Point 2 | 0 | 100% of nominal power | kW |
| Service Charge Point 2 | −100% of nominal power | 0 | kW |
| Service Discharge Point 3 | 0 | 100% of nominal power | kW |
| Service Charge Point 3 | −100% of nominal power | 0 | kW |

The parameters listed in Table 1 may be shown in the diagram 600. In Table 1, Hz/s may refer to hertz per second, and kW may refer to kilowatt. In table 1, nominal power may refer to, for example, the nominal output power of the one or more energy storage units coupled to the electrical grid (e.g., an output power level at which the one or more energy storage units may be configured to output electrical energy for scenarios where the actual frequency of the electrical grid is same as or substantially similar to the nominal frequency of the electrical grid and/or is not changing to a frequency substantially different from the nominal frequency). The maximum values and/or minimum values for the various parameters of the mapping may be configured to be other values as desired.

The mapping may be shaped by the parameters as shown in Table 1 above and in the diagram 600. The values of service discharge point 3 and service charge point 3 may be used to set the outer bounds of the mapping. The mapping may be characterized by 6 points (e.g., service discharge points 1, 2, 3 and service charge points 1, 2, 3) and the deadband. The deadband may indicate a range in which a rate of change of the frequency may be mapped to a value of zero for the amount of change of output power for the one or more energy storage units, when the rate of change of the frequency falls within the deadband. The service charge points and service discharge points may indicate parameters associated with, respectively, negative and positive amounts of change of output power for energy storage unit(s) (e.g., decrease and increase of the output power, respectively). The mapping may be used or configured by energy storage operators or administrators for synthetic inertia for the electrical grid.

The output of the mapping may be the synthetic inertia active power, APs, (whose unit may include, for example, kW) which may be proportional to the rate of change of the frequency and may be used for adjusting the output power of the energy storage unit(s) (e.g., by an active power dispatch controller for the energy storage unit(s)). The synthetic inertia feature may be enabled or disabled locally or remotely by the operator or administrator, and the parameters listed in Table 1 may be configurable locally or remotely by the operator or administrator.

An inertia constant (H) of the battery energy storage system (BESS) may be derived for a specific rate of change of the frequency (RoCoF) that the transmission system operator (TSO) may be expected to secure against using the equation below:

$$H = \frac{\Delta P_{SI\_max} \cdot f_0}{2 \cdot S_{rating} \cdot RoCoF}$$

In the equation above, $\Delta P_{SI\_max}$ may represent the overall synthetic inertia active power of the battery energy storage system (e.g., as allocated for a particular range of the rate of change of the frequency), whose unit may include, for example, megawatt (MW); $f_0$ may represent the nominal system frequency (e.g., 50 Hz or 60 Hz), whose unit may include, for example, hertz (Hz); $S_{rating}$ may represent the nominal mega-volt-ampere (MVA) rating of the battery energy storage system (e.g., the apparent power rating associated with the battery energy storage system), whose unit may include, for example, MVA; RoCoF may represent the rate of change of the frequency (e.g., may represent the extent of the span of the particular range of the rate of change of the frequency), whose unit may include, for example, hertz per second (Hz/s); and the unit of the inertia constant (H) may include, for example, MW·s/MVA. In some examples, $\Delta P_{SI\_max}$ may represent the amount of differential output power, additive to or subtractive from a reference output power of the energy storage unit(s), as allocated for a particular range of the rate of change of the frequency.

The slope of the mapping may include a constant that may indicate the inertia response of the battery energy storage system according to the equation below:

$$\text{Slope} = -\frac{\Delta P_{SI\_max}}{RoCoF} = -\frac{H \cdot S_{rating} \cdot 2}{f_0}$$

In the equation above, $H \cdot S_{rating}$ may represent inertia, whose unit may include, for example, MW·s; the unit of the slope may include, for example, MW·s/Hz.

Figure 7:
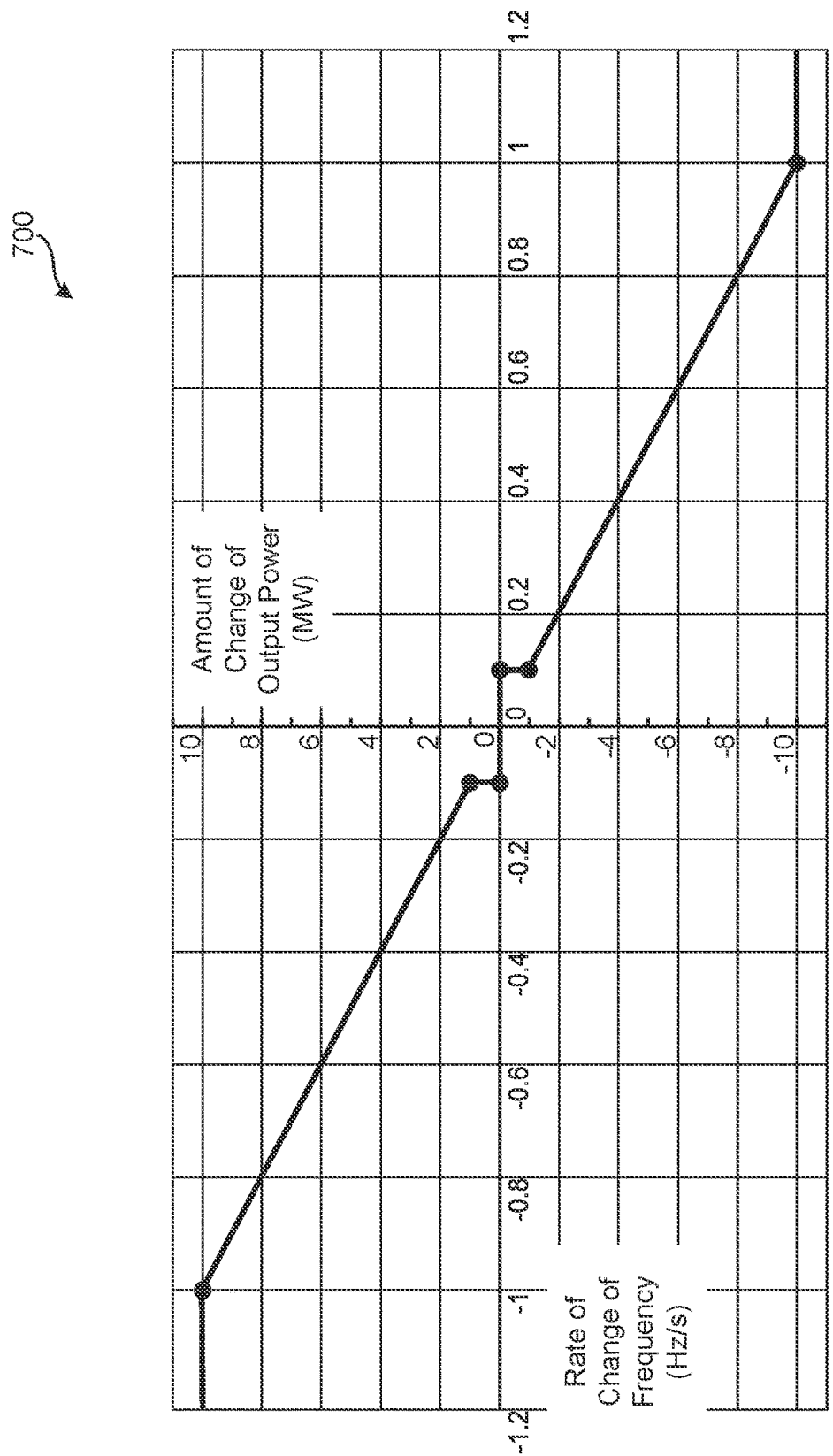
FIG. 7 shows a diagram of an example mapping, consistent with some embodiments of the present disclosure.

FIG. 7 shows a diagram 700 of an example mapping, consistent with some embodiments of the present disclosure. The mapping may be based on an example of configurations of the mapping parameters for synthetic inertia. A transmission system operator (e.g., an operator or administrator of the energy storage unit(s)) may be expected to secure the system against a RoCoF event of ±1 Hz/s and may allocate ±10 MW of synthetic inertia response power to a battery energy storage system rated at 60 MVA. A deadband of ±0.1 Hz/s may be set to minimize the activation of the synthetic inertia response of the battery energy storage system to insignificant frequency variations in the electrical grid. A deadband may provide the benefit to reduce activation of the synthetic inertia response of the battery energy storage system to insignificant frequency variations in the electrical grid. The inertia constant (H) may then be determined as follows:

$$H = \frac{10 \text{ MW} \cdot 50 \text{ Hz}}{2 \cdot 60 \text{ MVA} \cdot 1 \text{ Hz/s}} = 4.166667 \text{ MW} \cdot s/MVA$$

The corresponding inertia may be calculated as follows:

$$\text{Inertia} = H \cdot S_{rating} = 4.166667 \cdot 60 = 250 \text{ MW} \cdot s$$

The corresponding slope of the synthetic inertia response mapping may be as follows:

$$\text{Slope} = -\frac{H \cdot S_{rating} \cdot 2}{f_0} = -\frac{4.166667 \cdot 60 \cdot 2}{50} = -10 \text{ MW} \cdot s/Hz$$

As there may be a deadband configured between −0.1 to 0.1 Hz/s, the parameters of the mapping may be set so that the amount of change of output power for the one or more energy storage units may jump to a line that may connect the origin (0,0) to the service charge point 3 and service discharge point 3 at the +df/dt point 3 and −df/dt point 3, respectively as the measured df/dt value moves beyond the deadband. The parameters of the mapping may be defined as shown in Table 2 below.

TABLE 2

| Parameter Name | Value | Unit |
| --- | --- | --- |
| −df/dt deadband | −0.1 | Hz/s |
| +df/dt deadband | 0.1 | Hz/s |
| −df/dt Point 1 | −0.1 | Hz/s |
| +df/dt Point 1 | 0.1 | Hz/s |
| −df/dt Point 2 | −1.0 | Hz/s |
| +df/dt Point 2 | 1.0 | Hz/s |
| −df/dt Point 3 | −1.0 | Hz/s |

TABLE 2-continued

| Parameter Name | Value | Unit |
| --- | --- | --- |
| +df/dt Point 3 | 1.0 | Hz/s |
| Service Discharge Point 1 | 1,000 | kW |
| Service Charge Point 1 | −1,000 | kW |
| Service Discharge Point 2 | 10,000 | kW |
| Service Charge Point 2 | −10,000 | kW |
| Service Discharge Point 3 | 10,000 | kW |
| Service Charge Point 3 | −10,000 | kW |

In this example, the parameters for point 2 and point 3 may be set to the same value as only a single slope may be defined. The corresponding graph of the mapping is shown in FIG. 7. The graph may include various line segments of the mapping that may be symmetric with respect to the origin of the coordinate system. The graph may be used, for example, to be visually presented in a user interface, to allow a user to adjust the values of the parameters of the mapping, to determine an amount of change of the output power based on a rate of change of the frequency, or in any other desired manner. The values for the service charge points and service discharge points may be determined, for example, based on the synthetic inertia response power(s) as allocated for the RoCoF range(s) corresponding to the service charge points and service discharge points.

Figure 8:
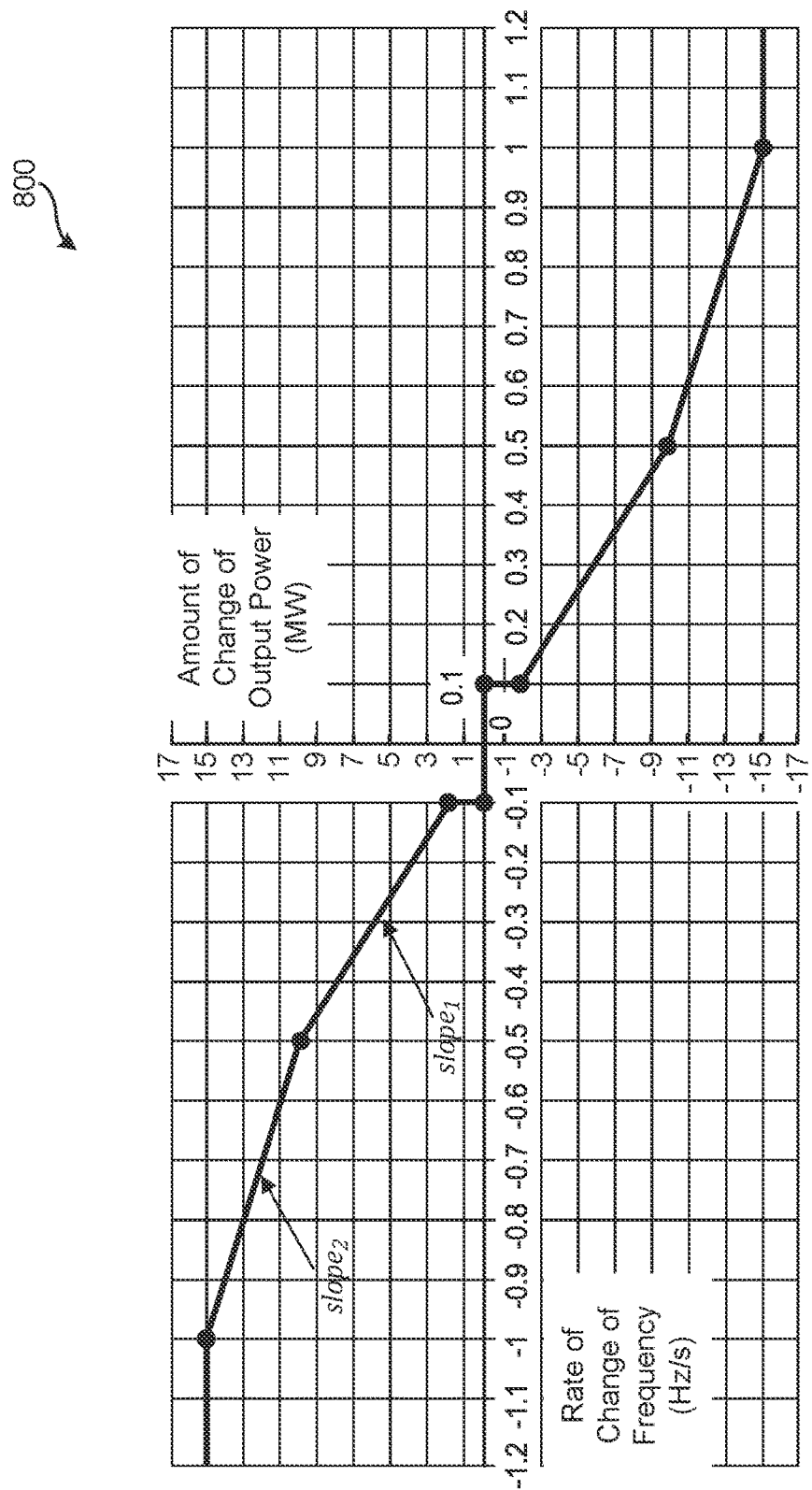
FIG. 8 shows a diagram of an example mapping, consistent with some embodiments of the present disclosure.

FIG. 8 shows a diagram 800 of an example mapping, consistent with some embodiments of the present disclosure. A transmission system operator (e.g., an operator or administrator of the energy storage unit(s)) may be expected to secure the system against a RoCoF event of ±1 Hz/s using a battery energy storage system rated at 60 MVA, and have two different synthetic inertia responses depending on the measured df/dt value. A deadband of ±0.1 Hz/s may be set to minimize the activation of the synthetic inertia response of the battery energy storage system to insignificant frequency variations in the electrical grid. A deadband may provide the benefit to reduce activation of the synthetic inertia response of the battery energy storage system to insignificant frequency variations in the electrical grid. For a df/dt value between ±0.1 Hz/s and ±0.5 Hz/s, ±10 MW of synthetic inertia response power may be allocated. And for df/dt values between ±0.5 Hz/s and ±1 Hz/s, an additional ±5 MW of synthetic inertia response power may be allocated.

The inertia constant of the synthetic inertia response between ±0.1 Hz/s and ±0.5 Hz/s ($H_1$) may be as follows:

$$H_1 = \frac{10 \text{ MW} \cdot 50 \text{ Hz}}{2 \cdot 60 MVA \cdot 0.5 \text{ Hz/s}} = 8.333333 \text{ MW} \cdot s/MVA$$

The corresponding inertia may be calculated as:

$$\text{Inertia}_1 = H_1 \cdot S_{rating} = 8.333333 \cdot 60 = 500 \text{ MW} \cdot s$$

The corresponding slope of the synthetic inertia response mapping may be as follows:

$$\text{Slope}_1 = -\frac{H_1 \cdot S_{rating} \cdot 2}{f_0} = -\frac{8.333333 \cdot 60 \cdot 2}{50} = -20 \text{ MW} \cdot s/Hz$$

The inertia constant of the synthetic inertia response between ±0.5 Hz/s and ±1 Hz/s ($H_2$) may be as follows:

$$H_2 = \frac{5 \text{ MW} \cdot 60 \text{ Hz}}{2 \cdot 60 \text{ } MVA \cdot 0.5 \text{ Hz/s}} = 4.166667 \text{ MW} \cdot s/MVA$$

The corresponding inertia may be calculated as:

$$\text{Inertia}_2 = H_2 \cdot S_{rating} = 4.166667 \cdot 60 = 250 \text{ MW} \cdot s$$

The corresponding slope of the synthetic inertia response mapping may be as follows:

$$\text{Slope}_2 = -\frac{H_2 \cdot S_{rating} \cdot 2}{f_0} = -\frac{4.166667 \cdot 60 \cdot 2}{50} = -10 \text{ MW} \cdot s/Hz$$

As there may be a deadband configured between −0.1 to 0.1 Hz/s, the parameters of the mapping may be set so that the amount of change of output power for the one or more energy storage units may jump to a line that may connect the origin (0,0) to the service charge point 2 and service discharge point 2 at the +df/dt point 2 and −df/dt point 2, respectively, as the measured df/dt value moves beyond the deadband. The parameters of the mapping may be defined as shown in Table 3 below.

TABLE 3

| Parameter Name | Value | Unit |
| --- | --- | --- |
| −df/dt deadband | −0.1 | Hz/s |
| +df/dt deadband | 0.1 | Hz/s |
| −df/dt Point 1 | −0.1 | Hz/s |
| +df/dt Point 1 | 0.1 | Hz/s |
| −df/dt Point 2 | −0.5 | Hz/s |
| +df/dt Point 2 | 0.5 | Hz/s |
| −df/dt Point 3 | −1.0 | Hz/s |
| +df/dt Point 3 | 1.0 | Hz/s |
| Service Discharge Point 1 | 2,000 | kW |
| Service Charge Point 1 | −2,000 | kW |
| Service Discharge Point 2 | 10,000 | kW |
| Service Charge Point 2 | −10,000 | kW |
| Service Discharge Point 3 | 15,000 | kW |
| Service Charge Point 3 | −15,000 | kW |

The corresponding graph of the mapping is shown in FIG. 8. The graph may include various line segments of the mapping that may be symmetric with respect to the origin of the coordinate system. The graph may be used, for example, to be visually presented in a user interface, to allow a user to adjust the values of the parameters of the mapping, to determine an amount of change of the output power based on a rate of change of the frequency, or in any other desired manner. The values for the service charge points and service discharge points may be determined, for example, based on the synthetic inertia response power(s) as allocated for the RoCoF range(s) corresponding to the service charge points and service discharge points.

Figure 9:
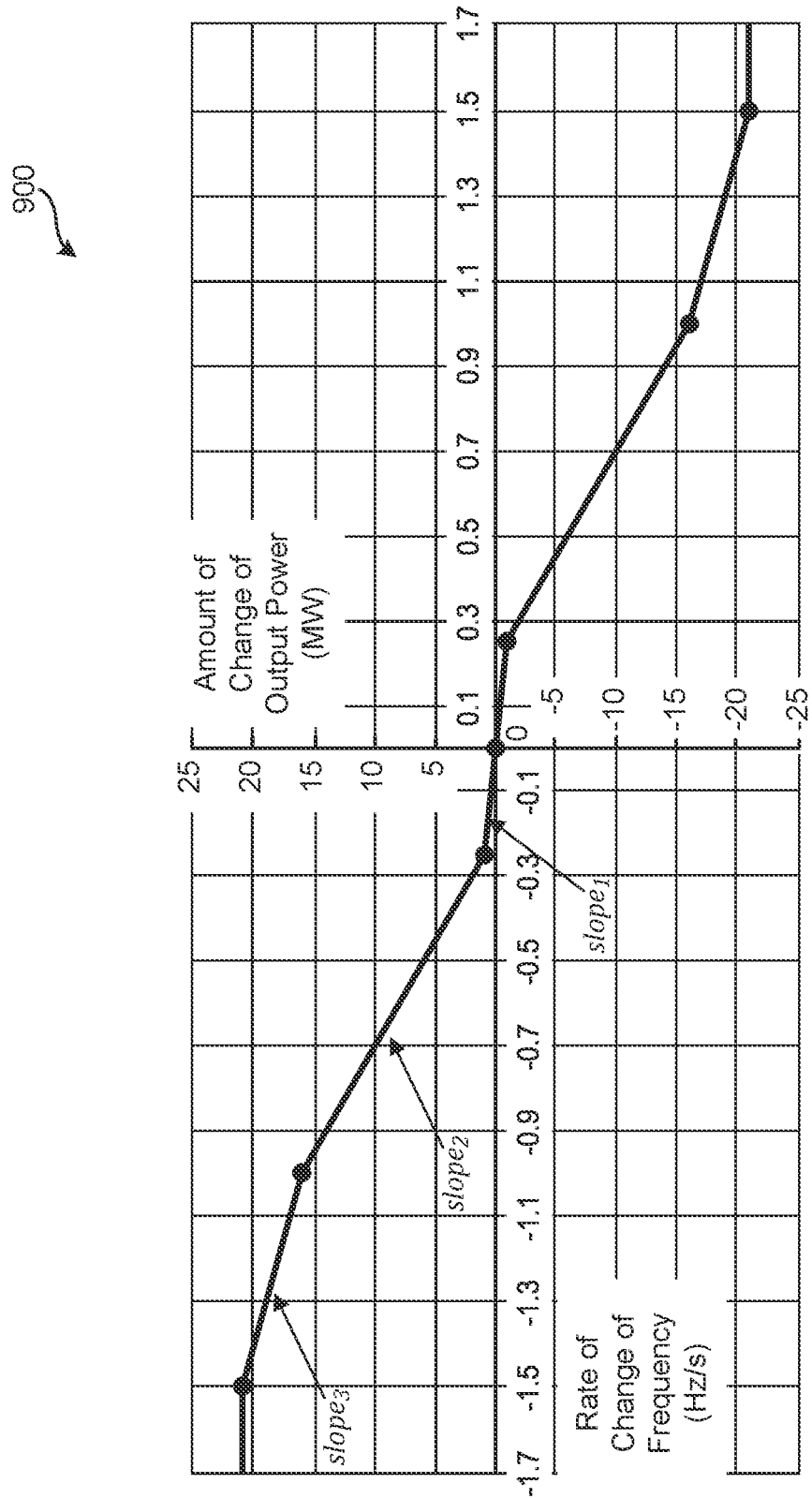
FIG. 9 shows a diagram of an example mapping, consistent with some embodiments of the present disclosure.

FIG. 9 shows a diagram 900 of an example mapping, consistent with some embodiments of the present disclosure. A transmission system operator (e.g., an operator or administrator of the energy storage unit(s)) may be expected to secure the system against a RoCoF event of ±1.5 Hz/s using a battery energy storage system rated at 60 MVA, and have three different synthetic inertia responses depending on the measured df/dt value with no deadband. For a df/dt value between 0 Hz/s and ±0.25 Hz/s, ±1 MW of synthetic inertia response power may be allocated. For df/dt values between ±0.25 Hz/s and ±1 Hz/s, an additional ±15 MW of synthetic inertia response power may be allocated. For df/dt values between ±1 Hz/s and ±1.5 Hz/s, an additional ±5 MW of synthetic inertia response power may be allocated.

The inertia constant of the synthetic inertia response between 0 Hz/s and ±0.25 Hz/s ($H_1$) may be as follows:

$$H_1 = \frac{1 \text{ MW} \cdot 50 \text{ Hz}}{2 \cdot 60 \text{ } MVA \cdot 0.25 \text{ Hz/s}} = 1.666667 \text{ MW} \cdot s/MVA$$

The corresponding inertia may be calculated as:

$$\text{Inertia}_1 = H_1 \cdot S_{rating} = 1.666667 \cdot 60 = 100 \text{ MW} \cdot s$$

The corresponding slope of the synthetic inertia response mapping may be as follows:

$$\text{Slope}_1 = -\frac{H_1 \cdot S_{rating} \cdot 2}{f_0} = -\frac{1.666667 \cdot 60 \cdot 2}{50} = -4 \text{ MW} \cdot s/Hz$$

The inertia constant of the synthetic inertia response between ±0.25 Hz/s and ±1 Hz/s ($H_2$) may be as follows:

$$H_2 = \frac{15 \text{ MW} \cdot 50 \text{ Hz}}{2 \cdot 60 \text{ } MVA \cdot 0.75 \text{ Hz/s}} = 8.333333 \text{ MW} \cdot s/MVA$$

The corresponding inertia may be calculated as:

$$\text{Inertia}_2 = H_2 \cdot S_{rating} = 8.333333 \cdot 60 = 500 \text{ MW} \cdot s$$

The corresponding slope of the synthetic inertia response mapping may be as follows:

$$\text{Slope}_2 = -\frac{H_2 \cdot S_{rating} \cdot 2}{f_0} = -\frac{8.333333 \cdot 60 \cdot 2}{50} = -20 \text{ MW} \cdot s/Hz$$

The inertia constant of the synthetic inertia response between ±1 Hz/s and ±1.5 Hz/s ($H_3$) may be as follows:

$$H_3 = \frac{5 \text{ MW} \cdot 50 \text{ Hz}}{2 \cdot 60 \text{ } MVA \cdot 0.5 \text{ Hz/s}} = 4.166667 \text{ MW} \cdot s/MVA$$

The corresponding inertia may be calculated as:

$$\text{Inertia}_3 = H_3 \cdot S_{rating} = 4.166667 \cdot 60 = 250 \text{ MW} \cdot s$$

The corresponding slope of the synthetic inertia response mapping may be as follows:

$$\text{Slope}_3 = -\frac{H_3 \cdot S_{rating} \cdot 2}{f_0} = -\frac{4.166667 \cdot 60 \cdot 2}{50} = -10 \text{ MW} \cdot s/Hz$$

The parameters of the mapping may be defined as shown in Table 4 below.

TABLE 4

| Parameter Name | Value | Unit |
| --- | --- | --- |
| −df/dt deadband | 0 | Hz/s |
| +df/dt deadband | 0 | Hz/s |
| −df/dt Point 1 | −0.25 | Hz/s |
| +df/dt Point 1 | 0.25 | Hz/s |
| −df/dt Point 2 | −1.0 | Hz/s |
| +df/dt Point 2 | 1.0 | Hz/s |
| −df/dt Point 3 | −1.5 | Hz/s |
| +df/dt Point 3 | 1.5 | Hz/s |
| Service Discharge Point 1 | 1,000 | kW |
| Service Charge Point 1 | −1,000 | kW |
| Service Discharge Point 2 | 16,000 | kW |
| Service Charge Point 2 | −16,000 | kW |
| Service Discharge Point 3 | 21,000 | kW |
| Service Charge Point 3 | −21,000 | kW |

The ±df/dt deadband parameters may be set to zero (0) as a deadband may not be specified or included in the mapping. The corresponding graph of the mapping is shown in FIG. 9. The graph may include various line segments of the mapping that may be symmetric with respect to the origin of the coordinate system. The graph may be used, for example, to be visually presented in a user interface, to allow a user to adjust the values of the parameters of the mapping, to determine an amount of change of the output power based on a rate of change of the frequency, or in any other desired manner. The values for the service charge points and service discharge points may be determined, for example, based on the synthetic inertia response power(s) as allocated for the RoCoF range(s) corresponding to the service charge points and service discharge points.

Figure 10:
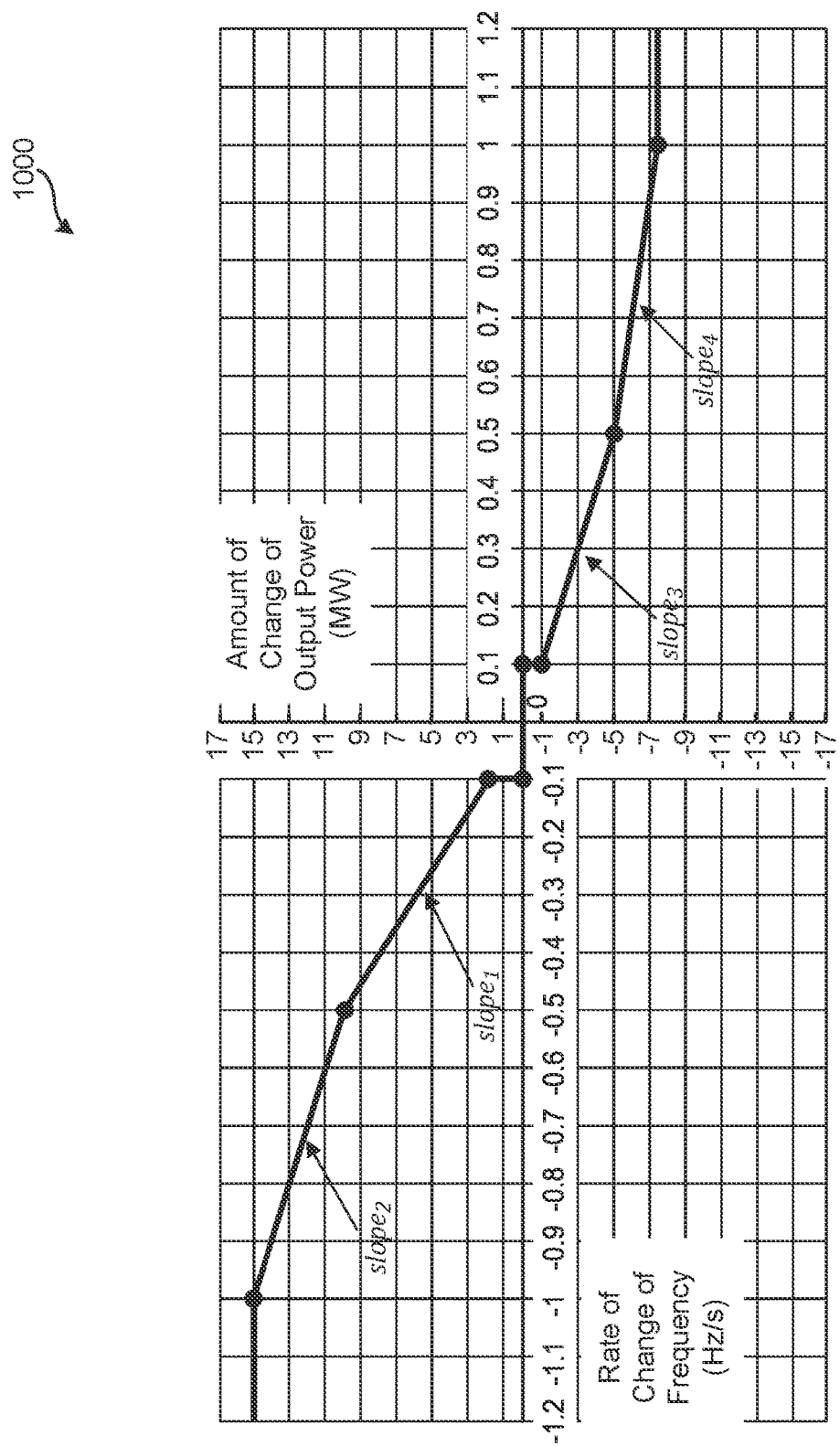
FIG. 10 shows a diagram of an example mapping, consistent with some embodiments of the present disclosure.

FIG. 10 shows a diagram 1000 of an example mapping, consistent with some embodiments of the present disclosure. A transmission system operator (e.g., an operator or administrator of the energy storage unit(s)) may be expected to secure the system against a RoCoF event of ±1 Hz/s using a battery energy storage system rated at 60 MVA, and have four different synthetic inertia responses depending on the measured df/dt value. A deadband of ±0.1 Hz/s may be set to minimize the activation of the synthetic inertia response of the battery energy storage system to insignificant frequency variations in the electrical grid. A deadband may provide the benefit to reduce activation of the synthetic inertia response of the battery energy storage system to insignificant frequency variations in the electrical grid. For a df/dt value between −0.1 Hz/s and −0.5 Hz/s, 10 MW of synthetic inertia response power may be allocated. For a df/dt value between −0.5 Hz/s and −1.0 Hz/s, an additional 5 MW of synthetic inertia response power may be allocated. In total, 15 MW of synthetic inertia response power may be allocated for these negative df/dt values. For a df/dt value between +0.1 Hz/s and +0.5 Hz/s, −5 MW of synthetic inertia response power may be allocated. For a df/dt value between +0.5 Hz/s and +1.0 Hz/s, an additional −2.5 MW of synthetic inertia response power may be allocated. In total, −7.5 MW of synthetic inertia response power may be allocated for these positive df/dt values.

The inertia constant of the synthetic inertia response between −0.1 Hz/s and −0.5 Hz/s ($H_1$) may be as follows:

$$H_1 = \frac{10 \text{ MW} \cdot 50 \text{ Hz}}{2 \cdot 60 \text{ } MVA \cdot 0.5 \text{ Hz/s}} = 8.333333 \text{ MW} \cdot s/MVA$$

The corresponding inertia may be calculated as:

$$\text{Inertia}_1 = H_1 \cdot S_{rating} = 8.33333 \cdot 60 = 500 \text{ MW} \cdot \text{s}$$

The corresponding slope of the synthetic inertia response mapping may be as follows:

$$\text{Slope}_1 = -\frac{H_1 \cdot S_{rating} \cdot 2}{f_0} = -\frac{8.333333 \cdot 60 \cdot 2}{50} = -20 \text{ MW} \cdot \text{s/Hz}$$

The inertia constant of the synthetic inertia response between ±0.5 Hz/s and ±1 Hz/s ($H_2$) may be as follows:

$$H_2 = \frac{5 \text{ MW} \cdot 50 \text{ Hz}}{2 \cdot 60 \text{ MVA} \cdot 0.5 \text{ Hz/s}} = 4.166667 \text{ MW} \cdot \text{s}/MVA$$

The corresponding inertia may be calculated as:

$$\text{Inertia}_2 = H_2 \cdot S_{rating} = 4.166667 \cdot 60 = 250 \text{ MW} \cdot \text{s}$$

The corresponding slope of the synthetic inertia response mapping may be as follows:

$$\text{Slope}_2 = -\frac{H_2 \cdot S_{rating} \cdot 2}{f_0} = -\frac{4.166667 \cdot 60 \cdot 2}{50} = -10 \text{ MW} \cdot \text{s/Hz}$$

The inertia constant of the synthetic inertia response between +0.1 Hz/s and +0.5 Hz/s ($H_3$) may be as follows:

$$H_3 = \frac{5 \text{ MW} \cdot 50 \text{ Hz}}{2 \cdot 60 \text{ MVA} \cdot 0.5 \text{ Hz/s}} = 4.166667 \text{ MW} \cdot \text{s}/MVA$$

The corresponding inertia may be calculated as:

$$\text{Inertia}_3 = H_3 \cdot S_{rating} = 4.166667 \cdot 60 = 250 \text{ MW} \cdot \text{s}$$

The corresponding slope of the synthetic inertia response mapping may be as follows:

$$\text{Slope}_3 = -\frac{H_3 \cdot S_{rating} \cdot 2}{f_0} = -\frac{4.166667 \cdot 60 \cdot 2}{50} = -10 \text{ MW} \cdot \text{s/Hz}$$

The inertia constant of the synthetic inertia response between +0.5 Hz/s and +1 Hz/s ($H_4$) may be as follows:

$$H_4 = \frac{2.5 \text{ MW} \cdot 50 \text{ Hz}}{2 \cdot 60 \text{ MVA} \cdot 0.5 \text{ Hz/s}} = 2.083333 \text{ MW} \cdot \text{s}/MVA$$

The corresponding inertia may be calculated as:

$$\text{Inertia}_4 = H_4 \cdot S_{rating} = 2.083333 \cdot 60 = 125 \text{ MW} \cdot \text{s}$$

The corresponding slope of the synthetic inertia response mapping may be as follows:

$$\text{Slope}_4 = -\frac{H_4 \cdot S_{rating} \cdot 2}{f_0} = -\frac{2.083333 \cdot 60 \cdot 2}{50} = -5 \text{ MW} \cdot \text{s/Hz}$$

As there may be a deadband configured between −0.1 to 0.1 Hz/s, the parameters of the mapping may be set so that the amount of change of output power for the one or more energy storage units may jump to a line that may connect the origin (0,0) to the service charge point 2 and service discharge point 2 at the +df/dt point 2 and −df/dt point 2, respectively as the measured df/dt value moves beyond the deadband. The parameters of the mapping may be defined as shown in Table 5 below.

TABLE 5

| Parameter Name | Value | Unit |
| --- | --- | --- |
| −df/dt deadband | −0.1 | Hz/s |
| +df/dt deadband | 0.1 | Hz/s |
| −df/dt Point 1 | −0.1 | Hz/s |
| +df/dt Point 1 | 0.1 | Hz/s |
| −df/dt Point 2 | −0.5 | Hz/s |
| +df/dt Point 2 | 0.5 | Hz/s |
| −df/dt Point 3 | −1.0 | Hz/s |
| +df/dt Point 3 | 1.0 | Hz/s |
| Service Discharge Point 1 | 2,000 | kW |
| Service Charge Point 1 | −1,000 | kW |
| Service Discharge Point 2 | 10,000 | kW |
| Service Charge Point 2 | −5,000 | kW |
| Service Discharge Point 3 | 15,000 | kW |
| Service Charge Point 3 | −7,500 | kW |

The corresponding graph of the mapping is shown in FIG. 10. The graph may include various line segments of the mapping that may be asymmetric with respect to the origin of the coordinate system. The graph may be used, for example, to be visually presented in a user interface, to allow a user to adjust the values of the parameters of the mapping, to determine an amount of change of the output power based on a rate of change of the frequency, or in any other desired manner. The values for the service charge points and service discharge points may be determined, for example, based on the synthetic inertia response power(s) as allocated for the RoCoF range(s) corresponding to the service charge points and service discharge points.

Disclosed embodiments include calculating, based on the mapping and the rate of change of the frequency, an amount of change of the output power for the one or more energy storage units. For example, after determining a measured rate of change of the frequency of the electrical grid, and determining the mapping (e.g., by accessing the mapping stored in a data storage), the computing device may determine an amount of change of the output power for the energy storage unit(s) coupled to the electrical grid. The computing device may, for example, use the mapping to determine the amount of change of the output power corresponding to the measured rate of change of the frequency. As one example, the measured rate of change of the frequency may be used as the input variable to a function representing the mapping, and the output variable of the function may be the amount of change of the output power. For example, with reference to FIG. 8, using a mapping as described in connection with FIG. 8, if the measured rate of change of the frequency is −0.3 Hz/s, the corresponding output of the mapping may be 6 MW, as shown in FIG. 8.

Disclosed embodiments include setting the calculated amount of change to zero based on determining that an absolute value of the rate of change of the frequency is less than a threshold value. For example, the computing device may determine that the amount of change of the output power for the energy storage unit(s) may be zero (0), if the measured rate of change of the frequency is within a rate range (e.g., the deadband as described herein). The rate range may be configured (e.g., by an operator or administrator of the energy storage unit(s)) to have any desired outer bounds (e.g., −0.1 Hz/s to 0.1 Hz/s, −0.05 Hz/s to 0.05 Hz/s, −0.1 Hz/s to 0.05 Hz/s, −0.05 Hz/s to 0.1 Hz/s, or any other desired span). In some examples, the computing device may determine that the amount of change of the output power for the energy storage unit(s) may be zero (0), if an absolute value of the rate of change of the frequency is less than a threshold value. The absolute value of the rate of change of the frequency may include, for example, the non-negative value of the rate of change of the frequency without regard to its sign. The threshold value may be configured (e.g., by an operator or administrator of the energy storage unit(s)) to include any desired value (e.g., 0.05 Hz/s, 0.1 Hz/s, 0.2 Hz/s, or any other desired value).

With reference to FIG. 4, in step 416, the computing device may calculate, based on the mapping and the rate of change of the frequency, an amount of change of the output power for the one or more energy storage units. With reference to FIG. 5, after the measured rate of change of the frequency in block 510 being input to the mapping 512, the mapping 512 may determine an amount of change of output power for the one or more energy storage units coupled to the electrical grid in block 514.

Disclosed embodiments include determining, based on a reference output power for the one or more energy storage units and the calculated amount of change, an adjusted output power. The reference output power for the energy storage unit(s) may include, for example, a level of output power of the energy storage unit(s) designated for scenarios where the actual frequency of the electrical grid is same as or substantially similar to the nominal frequency of the electrical grid, and/or is not changing to a frequency substantially different from the nominal frequency of the electrical grid. For example, the reference output power may be determined based on an energy output pattern or energy dispatch pattern (e.g., as configured by an operator or administrator of the energy storage unit(s) based on supply and demand of electrical energy in the electrical grid and/or other factors for determining an output power level) without considering frequency variations of the electrical grid.

In some embodiments, the adjusted output power corresponds to a combination of the reference output power and the calculated amount of change. The combination of the reference output power and the calculated amount of change may be performed in any desired manner. In some examples, the adjusted output power may correspond to a sum of the reference output power and the calculated amount of change of the output power for the energy storage unit(s). The summing may be performed in a form of addition (e.g., when the calculated amount of change includes a positive value or indicates an increase to the reference output power) or in a form of subtraction (e.g., when the calculated amount of change includes a negative value or indicates a decrease from the reference output power).

In some embodiments, the mapping causes the one or more energy storage units to decrease output power from the reference output power when the rate of change of the frequency indicates an increase of the frequency. In some embodiments, the mapping causes the one or more energy storage units to increase output power from the reference output power when the rate of change of the frequency indicates a decrease of the frequency. For example, the amount of change of the output power calculated based on the mapping may indicate a negative value when the measured rate of change of the frequency indicates an increase of the frequency. And the adjusted output power may be smaller than the reference output power, as the calculated amount of change of the output power may be summed with the reference output power to determine the adjusted output power. For example, with reference to FIG. 8, when a rate of change of the frequency is a positive value (e.g., 0.5 Hz/s) indicating an increase of the frequency, the amount of change of the output power calculated based on the mapping described in connection with FIG. 8 may include a negative value (e.g., −10 MW).

As another example, the amount of change of the output power calculated based on the mapping may indicate a positive value when the measured rate of change of the frequency indicates a decrease of the frequency. And the adjusted output power may be larger than the reference output power, as the calculated amount of change of the output power may be summed with the reference output power to determine the adjusted output power. For example, with reference to FIG. 8, when a rate of change of the frequency is a negative value (e.g., −0.5 Hz/s) indicating a decrease of the frequency, the amount of change of the output power calculated based on the mapping described in connection with FIG. 8 may include a positive value (e.g., 10 MW). Adjusting the output power of the energy storage unit(s) coupled to the electrical grid may help slow, or reduce the magnitude of, the rate of change of the frequency of the electrical grid (e.g., by contributing to balancing the supply and demand of electrical energy in the electrical grid).

With reference to FIG. 4, in step 418, the computing device may determine, based on a reference output power for the one or more energy storage units and the calculated amount of change, an adjusted output power. With reference to FIG. 5, the amount of change of the output power in block 514 may be summed with the reference output power in block 516 at the summing function 518, which may output the adjusted output power in block 520.

Disclosed embodiments include configuring, based on the adjusted output power, the one or more energy storage units to output electricity to the electrical grid. For example, after determining the adjusted output power, the computing device may configure, based on the adjusted output power, the one or more energy storage units to output electricity to the electrical grid. The energy storage unit(s) may be configured to output electricity to the electrical grid at the level of the adjusted output power. As one example, the energy storage unit(s) may be configured to increase or decrease the power level at which the energy storage unit(s) output electrical energy from the reference output power, for example, according to the calculated amount of change of the output power (e.g., the amount of change of the output power in block 514) indicating an increase or decrease of output power.

Configuring the energy storage unit(s) may include, for example, instructing the control components for the energy storage unit(s) (e.g., the batteries therein) to output or discharge during a particular time at a particular rate (e.g., based on the level of the adjusted output power) to the electrical grid. The one or more energy storage units outputting or discharging electrical energy may be controlled using appropriate techniques, such as circuits with switch controls, charge or discharge controllers, charge or discharge regulators, battery regulators, and/or the like, so that the one or more energy storage units may be controlled to be in a state of outputting electricity to the electrical grid at a particular rate. Additionally or alternatively, power conversion systems used to couple the batteries of the energy storage unit(s) to the electrical grid may be controlled by the computing device, to adjust parameters of the power conversion systems (e.g., to accommodate the changes to the output power levels of the batteries). In some examples, coordinated control of the batteries of the energy storage unit(s), the power conversion systems of the energy storage unit(s), and/or other components, elements, and/or devices associated with the energy storage unit(s) may be performed to adjust the output power of the energy storage unit(s). Adjusting the output power of the energy storage unit(s) coupled to the electrical grid may help slow, or reduce the magnitude of, the rate of change of the frequency of the electrical grid (e.g., by contributing to balancing the supply and demand of electrical energy in the electrical grid). Additionally or alternatively, the processes associated with measuring the rate of change of the frequency and/or adjusting the output power of the energy storage unit(s) may be performed periodically or continuously. For example, after the configuring of the energy storage unit(s) based on the adjusted output power, the rate of change of the frequency may be measured and/or determined again, and the output power of the energy storage unit(s) may be adjusted based on the later measured and/or determined rate of change of the frequency (e.g., if an absolute value of the later measured and/or determined rate of change of the frequency is not below a threshold).

In some embodiments, the adjusted output power includes active power to be dispatched by the one or more energy storage units. Power as used herein may refer to, for example, the amount of energy transferred or converted per unit time. Active power may refer to, for example, the real or actual power that may be really transferred to a load, dissipated in a circuit, and/or actually utilized or consumed (e.g., in contrast to reactive power, which may refer to, for example, a power that may continuously bounce back and forth or oscillate between a source and a load). The adjusted output power may include active power that the energy storage unit(s) may dispatch, output, or discharge, and/or may indicate the level of output power which may be actually transferred from the energy storage unit(s) to a load. The adjusted active power may contribute to balancing the supply and demand of electrical energy in the electrical grid, and/or may help slow, or reduce the magnitude of, the rate of change of the frequency of the electrical grid.

With reference to FIG. 4, in step 420, the computing device may configure, based on the adjusted output power, the one or more energy storage units to output electricity to the electrical grid. With reference to FIG. 5, the adjusted output power in block 520 may be provided to and/or used for the output power configuration for the energy storage unit(s) in block 522.

In some examples, the energy storage unit(s) (e.g., 112A, 112B, 112C) whose output power may be adjusted based on a measured rate of change of the frequency of the electrical grid to which the energy storage unit(s) may be coupled may be configured in a grid-following manner. For example, the energy storage unit(s) may be configured to follow the angle, frequency, and/or oscillation of the voltage of the electrical grid. The energy storage unit(s) may be configured to track the voltage angle of the electrical grid, for example, using a phase-locked loop (PLL), a voltage sensor, or any other suitable system, and/or may be configured to track the voltage frequency of the electrical grid, for example, using a frequency sensor, a voltage sensor, or any other suitable system. Power conversion systems of the energy storage unit(s) (e.g., power inverters) may be controlled, for example, based on the tracked voltage angle of the electrical grid and/or the tracked voltage frequency of the electrical grid, in such a manner that the alternating current outputted by the energy storage unit(s) may synchronize with the angle, frequency, and/or oscillation of the voltage of the electrical grid.

In some examples, the functions, processes, or methods as described herein may aim to limit the rate of change of the frequency following a disturbance in an electrical grid (e.g., a sudden imbalance between supply and demand of electrical energy in the electrical grid). The functions, processes, or methods as described herein may include, for example, the capability of energy storage unit(s) (e.g., a battery energy storage system) coupled to an electrical grid to provide an active power response based on the rate of change of the frequency of the electrical grid within a particular time period (e.g., within 200 milliseconds or any other desired time length) of an event of change of the frequency of the electrical grid. The response time may depend on the configuration of the battery energy storage system. In some examples, some of the components that may contribute to the total response time may include, for example, the computing device (e.g., a controller for the energy storage unit(s)) response time (e.g., around or less than 100 milliseconds), and/or the power conversion system (e.g., a power inverter) response time (e.g., around or less than 100 milliseconds). In some examples, the battery energy storage system may be configured to remain connected, and/or continue to output electrical energy, to the electrical grid for a rate of change of the frequency not exceeding a particular limit (e.g., 2 Hz/s, 2.5 Hz/s, 3 Hz/s, 3.5 Hz/s, or any other desired value).

Disclosed embodiments include determining amounts of differential output power of the one or more energy storage units allocated for the plurality of ranges of the rate of change of the frequency. In some embodiments, the differential output power is additive to or subtractive from the reference output power. Disclosed embodiments include calculating, based on the amounts of the differential output power and the plurality of ranges, the plurality of ratios. As described above (e.g., in connection with FIGS. 6-10), for configuring the mapping, amounts of differential output power of the energy storage unit(s) may be allocated for each of the plurality of ranges of the rate of change of the frequency. The differential output power may indicate, for example, an increase or decrease from the reference output power for the energy storage unit(s). In some examples, an allocated amount of differential output power may be additive to the reference output power (e.g., may be a positive value). In some examples, an allocated amount of differential output power may be subtractive from the reference output power (e.g., may be a negative value). Using the allocated amounts of the differential output power and the plurality of ranges of the rate of change of the frequency, the plurality of ratios of the mapping (e.g., values of slope of line segments of the mapping) may be calculated (e.g., as described in connection with FIGS. 6-10). As one example, a ratio of the mapping applicable to a particular range of the rate of change of the frequency (e.g., a value of slope of a line segment of the mapping) may be calculated based on dividing the amount of differential output power allocated for the particular range by the extent of the span of the range. In some examples, two or more of the allocated amounts of differential output power may be different from each other, contributing to causing that two or more of the plurality of ratios of the mapping may be different from each other.

In some examples, the functions, processes, or methods as described herein may be performed for the one or more energy storage units as a group. For example, various parameters as described herein (e.g., the reference output power, the amount of change of output power, and/or the adjusted output power) may be configured, determined, and/or calculated for the energy storage unit(s) as a group. In some examples, the functions, processes, or methods as described herein may be performed on the basis of multiple energy storage units as a group. In some examples, the functions, processes, or methods as described herein may be performed on the basis of a single energy storage unit individually. Additionally or alternatively, the functions, processes, or methods as described herein may be performed on the basis of a smaller scale than an energy storage unit (e.g., on the basis of one or more batteries, for example, within an energy storage unit). In some examples, historical measurement data of the rate of change of the frequency, historical data associated with adjusting the output power for the energy storage unit(s), and/or any other data used in or associated with the processes as described herein may be accessed, used, and/or exported by an authorized user (e.g., an operator or administrator of the energy storage unit(s)). In some examples, parameters for accessing the data (e.g., the resolution of the data and the frequency or method of accessing the data) may be configured by an authorized user. These data may be used, for example, for data analysis for the energy storage unit(s), configuration of the energy storage unit(s), or for other desired purposes.

Disclosed embodiments include a method for operating one or more energy storage units, the method including: obtaining, by a computing device, a rate of change of a frequency of alternating current of an electrical grid. In some embodiments, the one or more energy storage units are coupled to the electrical grid. In some embodiments, the method includes: determining a mapping between the rate of change of the frequency and an amount of change of output power for the one or more energy storage units; calculating, based on the mapping and the rate of change of the frequency, an amount of change of the output power for the one or more energy storage units; determining, based on a reference output power for the one or more energy storage units and the calculated amount of change, an adjusted output power; and configuring, based on the adjusted output power, the one or more energy storage units to output electricity to the electrical grid. In some embodiments, the measurements are obtained at one or more of: a high voltage section of the electrical grid; or a medium voltage section of the electrical grid. In some embodiments, the mapping includes a plurality of ratios, and each ratio of the plurality of ratios is a constant value applicable to a particular range of a plurality of ranges of the rate of change of the frequency. In some embodiments, the mapping includes a piecewise linear function defining a relationship between the rate of change of the frequency and an amount of change of the output power for the one or more energy storage units. In some embodiments, a graph of the piecewise linear function includes a plurality of line segments having different values of slope.

Disclosed embodiments include a non-transitory computer-readable medium for operating one or more energy storage units, the non-transitory computer-readable medium storing instructions that, when executed by at least one processor, cause the at least one processor to: obtain a rate of change of a frequency of alternating current of an electrical grid. In some embodiments, the one or more energy storage units are coupled to the electrical grid. In some embodiments, the instructions, when executed by at least one processor, cause the at least one processor to: determine a mapping between the rate of change of the frequency and an amount of change of output power for the one or more energy storage units; calculate, based on the mapping and the rate of change of the frequency, an amount of change of the output power for the one or more energy storage units; determine, based on a reference output power for the one or more energy storage units and the calculated amount of change, an adjusted output power; and configure, based on the adjusted output power, the one or more energy storage units to output electricity to the electrical grid. In some embodiments, the measurements are obtained at one or more of: a high voltage section of the electrical grid; or a medium voltage section of the electrical grid. In some embodiments, the mapping includes a plurality of ratios, and each ratio of the plurality of ratios is a constant value applicable to a particular range of a plurality of ranges of the rate of change of the frequency. In some embodiments, the mapping includes a piecewise linear function defining a relationship between the rate of change of the frequency and an amount of change of the output power for the one or more energy storage units. In some embodiments, a graph of the piecewise linear function includes a plurality of line segments having different values of slope.

Implementation of the method and system of the present disclosure may involve performing or completing certain selected tasks or steps manually, automatically, or a combination thereof. Moreover, according to actual instrumentation and equipment of preferred embodiments of the method and system of the present disclosure, several selected steps may be implemented by hardware (HW) or by software (SW) on any operating system of any firmware, or by a combination thereof. For example, as hardware, selected steps of the disclosure could be implemented as a chip or a circuit. As software or algorithm, selected steps of the disclosure could be implemented as a plurality of software instructions being executed by a computer using any suitable operating system. In any case, selected steps of the method and system of the disclosure could be described as being performed by a data processor, such as a computing device for executing a plurality of instructions.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet. The computing system can include clients and servers. A client and server are generally remote from each other and typically interact through a communication network. The relationship of client and server arises by virtue of computer programs running on the respective computers and having a client-server relationship to each other.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure may be implemented as hardware alone.

It is appreciated that the above-described embodiments can be implemented by hardware, or software (program codes), or a combination of hardware and software. If implemented by software, it can be stored in the above-described computer-readable media. The software, when executed by the processor can perform the disclosed methods. The computing units and other functional units described in the present disclosure can be implemented by hardware, or software, or a combination of hardware and software. One of ordinary skill in the art will also understand that multiple ones of the above-described modules/units can be combined as one module or unit, and each of the above-described modules/units can be further divided into a plurality of sub-modules or sub-units.

The block diagrams in the figures illustrate the architecture, functionality, and operation of possible implementations of systems, methods, and computer hardware or software products according to various example embodiments of the present disclosure. In this regard, each block in a flowchart or block diagram may represent a module, segment, or portion of code, which includes one or more executable instructions for implementing the specified logical functions. It should be understood that in some alternative implementations, functions indicated in a block may occur out of order noted in the figures. For example, two blocks shown in succession may be executed or implemented substantially concurrently, or two blocks may sometimes be executed in reverse order, depending upon the functionality involved. Some blocks may also be omitted. It should also be understood that each block of the block diagrams, and combination of the blocks, may be implemented by special purpose hardware-based systems that perform the specified functions or acts, or by combinations of special purpose hardware and computer instructions.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as example only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

It will be appreciated that the embodiments of the present disclosure are not limited to the exact construction that has been described above and illustrated in the accompanying drawings, and that various modifications and changes may be made without departing from the scope thereof. And other embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application. These examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

The invention claimed is:

1. A system comprising:
    one or more energy storage units coupled to an electrical grid; and
    a computing device comprising at least one processor and at least one memory storing instructions that, when executed by the at least one processor, cause the computing device to:
        obtain a rate of change of a frequency of alternating current of the electrical grid;
        determine a mapping between the rate of change of the frequency and an amount of change of output power for the one or more energy storage units;

calculate, based on the mapping and the rate of change of the frequency, an amount of change of the output power for the one or more energy storage units;

determine, based on a reference output power for the one or more energy storage units and the calculated amount of change, an adjusted output power; and configure, based on the adjusted output power, the one or more energy storage units to output electricity to the electrical grid.

2. The system of claim 1, wherein the rate of change of the frequency is based on measurements obtained at one or more of:

a high voltage section of the electrical grid; or a medium voltage section of the electrical grid.

3. The system of claim 1, wherein the instructions, when executed by the at least one processor, cause the computing device to obtain the rate of change of the frequency by one or more of:

receiving the rate of change of the frequency from a metering unit; or receiving measurements of the frequency and calculating the rate of change of the frequency based on the measurements of the frequency.

4. The system of claim 1, wherein the mapping comprises a plurality of ratios, and wherein each ratio of the plurality of ratios is a constant value applicable to a particular range of a plurality of ranges of the rate of change of the frequency.

5. The system of claim 4, wherein the plurality of ranges are non-overlapping.

6. The system of claim 4, wherein each ratio of the plurality of ratios indicates a variation in an amount of change of the output power divided by a corresponding change in the rate of change of the frequency, and wherein two or more of the plurality of ratios are different for different ranges of the rate of change of the frequency.

7. The system of claim 4, wherein the instructions, when executed by the at least one processor, cause the computing device to:

determine amounts of differential output power of the one or more energy storage units allocated for the plurality of ranges of the rate of change of the frequency, wherein the differential output power is additive to or subtractive from the reference output power; and calculate, based on the amounts of the differential output power and the plurality of ranges, the plurality of ratios.

8. The system of claim 1, wherein the mapping comprises a piecewise linear function defining a relationship between the rate of change of the frequency and an amount of change of the output power for the one or more energy storage units, and wherein a graph of the piecewise linear function comprises a plurality of line segments having different values of slope.

9. The system of claim 1, wherein the instructions, when executed by the at least one processor, cause the computing device to:

set the calculated amount of change to zero based on determining that an absolute value of the rate of change of the frequency is less than a threshold value.

10. The system of claim 1, wherein the mapping causes the one or more energy storage units to decrease output power from the reference output power when the rate of change of the frequency indicates an increase of the frequency, and wherein the mapping causes the one or more energy storage units to increase output power from the reference output power when the rate of change of the frequency indicates a decrease of the frequency.

11. The system of claim 1, wherein the adjusted output power corresponds to a combination of the reference output power and the calculated amount of change.

12. The system of claim 1, wherein the adjusted output power comprises active power to be dispatched by the one or more energy storage units.

13. A method for operating one or more energy storage units, the method comprising:

obtaining, by a computing device, a rate of change of a frequency of alternating current of an electrical grid, wherein the one or more energy storage units are coupled to the electrical grid;

determining a mapping between the rate of change of the frequency and an amount of change of output power for the one or more energy storage units;

calculating, based on the mapping and the rate of change of the frequency, an amount of change of the output power for the one or more energy storage units;

determining, based on a reference output power for the one or more energy storage units and the calculated amount of change, an adjusted output power; and configuring, based on the adjusted output power, the one or more energy storage units to output electricity to the electrical grid.

14. The method of claim 13, wherein the rate of change of the frequency is based on measurements obtained at one or more of:

a high voltage section of the electrical grid; or a medium voltage section of the electrical grid.

15. The method of claim 13, wherein the mapping comprises a plurality of ratios, and wherein each ratio of the plurality of ratios is a constant value applicable to a particular range of a plurality of ranges of the rate of change of the frequency.

16. The method of claim 13, wherein the mapping comprises a piecewise linear function defining a relationship between the rate of change of the frequency and an amount of change of the output power for the one or more energy storage units, and wherein a graph of the piecewise linear function comprises a plurality of line segments having different values of slope.

17. A non-transitory computer-readable medium for operating one or more energy storage units, the non-transitory computer-readable medium storing instructions that, when executed by at least one processor, cause the at least one processor to:

obtain a rate of change of a frequency of alternating current of an electrical grid, wherein the one or more energy storage units are coupled to the electrical grid;

determine a mapping between the rate of change of the frequency and an amount of change of output power for the one or more energy storage units;

calculate, based on the mapping and the rate of change of the frequency, an amount of change of the output power for the one or more energy storage units;

determine, based on a reference output power for the one or more energy storage units and the calculated amount of change, an adjusted output power; and configure, based on the adjusted output power, the one or more energy storage units to output electricity to the electrical grid.

18. The non-transitory computer-readable medium of claim 17, wherein the rate of change of the frequency is based on measurements obtained at one or more of:

a high voltage section of the electrical grid; or a medium voltage section of the electrical grid.

19. The non-transitory computer-readable medium of claim 17, wherein the mapping comprises a plurality of ratios, and wherein each ratio of the plurality of ratios is a constant value applicable to a particular range of a plurality of ranges of the rate of change of the frequency.

20. The non-transitory computer-readable medium of claim 17, wherein the mapping comprises a piecewise linear function defining a relationship between the rate of change of the frequency and an amount of change of the output power for the one or more energy storage units, and wherein a graph of the piecewise linear function comprises a plurality of line segments having different values of slope.

\* \* \* \* \*